(12) United States Patent
Shiraishi

(10) Patent No.: US 9,807,255 B2
(45) Date of Patent: Oct. 31, 2017

(54) IMAGE PROCESSING APPARATUS

(71) Applicant: CANON KABUSHIKI KAISHA, Tokyo (JP)

(72) Inventor: Yasuhiro Shiraishi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/258,601

(22) Filed: Sep. 7, 2016

(65) Prior Publication Data
US 2017/0070696 A1 Mar. 9, 2017

(30) Foreign Application Priority Data

Sep. 8, 2015 (JP) ................. 2015-176960

(51) Int. Cl.
*H04N 5/232* (2006.01)
*H04N 1/00* (2006.01)
*H04N 5/378* (2011.01)
*H04N 5/374* (2011.01)

(52) U.S. Cl.
CPC ..... *H04N 1/00095* (2013.01); *H04N 5/23203* (2013.01); *H04N 5/23229* (2013.01); *H04N 5/378* (2013.01); *H04N 5/3742* (2013.01)

(58) Field of Classification Search
CPC ........... H04N 1/00095; H04N 5/23203; H04N 5/23229; H04N 5/3742; H04N 5/378; H04N 5/3745; H04N 5/37452; H04N 5/376; H04N 5/38; H04N 5/44; H04N 5/14
USPC ..................................................... 348/222.1
See application file for complete search history.

(56) References Cited

U.S. PATENT DOCUMENTS

| 5,761,726 | A | * | 6/1998 | Guttag | ................ G06F 12/0284 711/147 |
|---|---|---|---|---|---|
| 6,119,204 | A | * | 9/2000 | Chang | ................ G06F 12/1027 711/141 |
| 8,547,453 | B2 | * | 10/2013 | Mabuchi | ................ H04N 5/772 348/231.9 |
| 8,854,488 | B2 | * | 10/2014 | Shiomi | ................ H04N 5/232 348/222.1 |
| 9,098,674 | B2 | * | 8/2015 | Murphy | ............... G06F 15/8053 |
| 9,225,904 | B2 | * | 12/2015 | Furuya | ................... H04N 1/212 |
| 9,699,374 | B2 | * | 7/2017 | Song | ................... H04N 5/23222 |
| 2008/0266422 | A1 | * | 10/2008 | Mabuchi | ................ H04N 5/772 348/231.99 |

(Continued)

FOREIGN PATENT DOCUMENTS

JP 2013-003986 A 1/2013

*Primary Examiner* — Pritham Prabhakher
(74) *Attorney, Agent, or Firm* — Carter, DeLuca, Farrell & Schmidt, LLP

(57) ABSTRACT

Image data output from an image capturing unit is input to an image processing circuit, and the image processing circuit is connected in cascade to another image processing circuit. With the image processing circuit, a portion of the image data for which processing is shared is processed by the image processing circuit, the processed image data is multiplexed by a multiplexing unit with another portion of the image data to be processed by the other image processing circuit, and is transmitted to the other image processing circuit by an output IF unit. The other image processing circuit processes its share of the image data and displays it along with the processed image data received from an image processing unit.

14 Claims, 18 Drawing Sheets

(56) References Cited

U.S. PATENT DOCUMENTS

| | | | |
|---|---|---|---|
| 2010/0027679 A1* | 2/2010 | Sunahara | H04N 21/2381 375/240.24 |
| 2012/0026281 A1* | 2/2012 | Murphy | G06T 1/20 348/14.09 |
| 2012/0098987 A1* | 4/2012 | Tsuda | H04N 1/2141 348/222.1 |

* cited by examiner

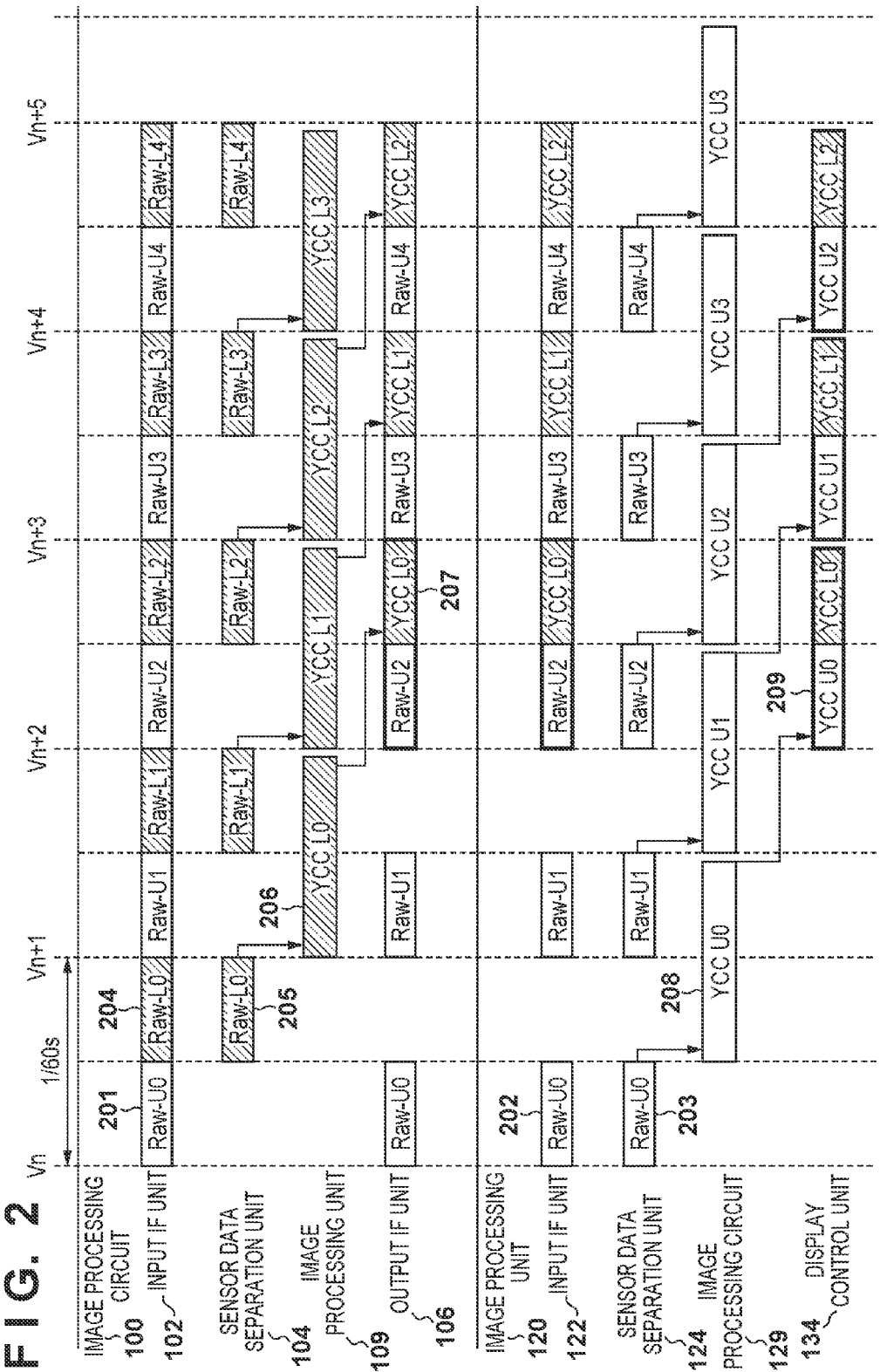

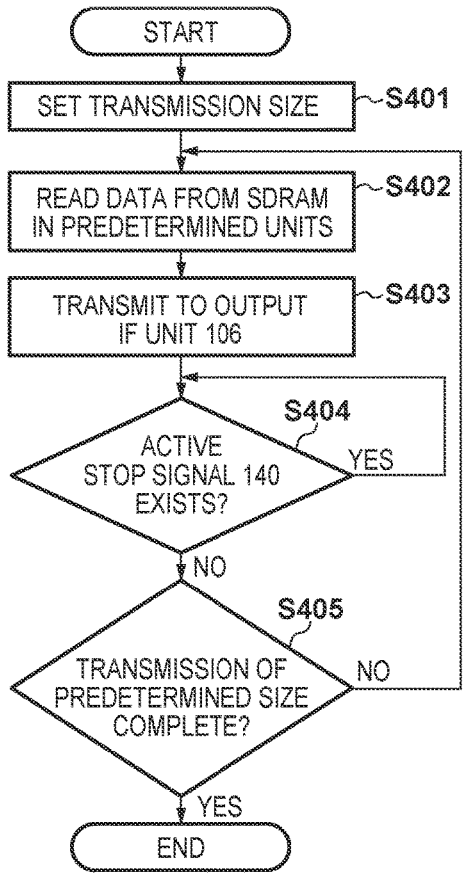
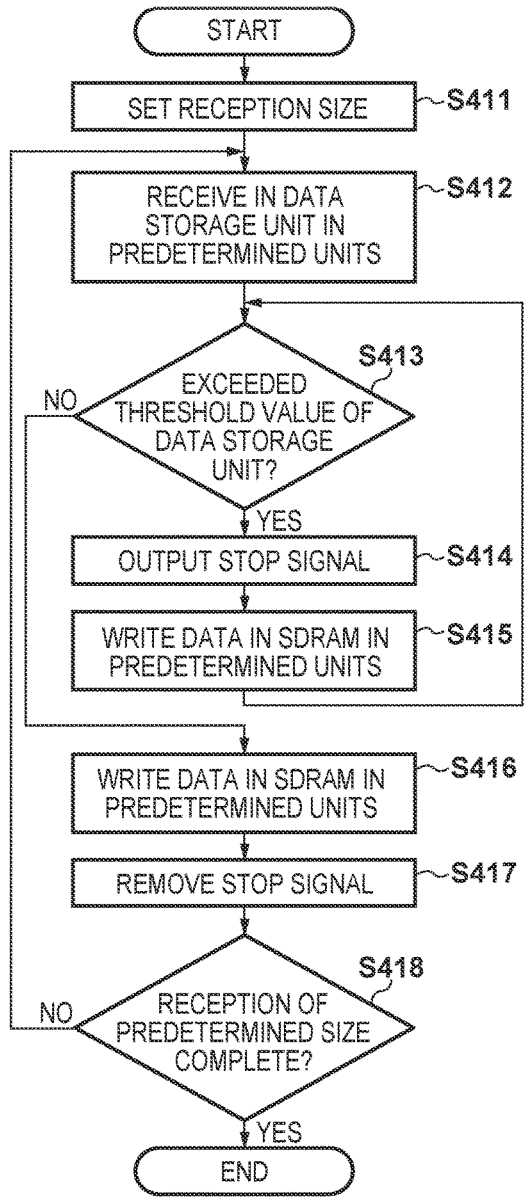

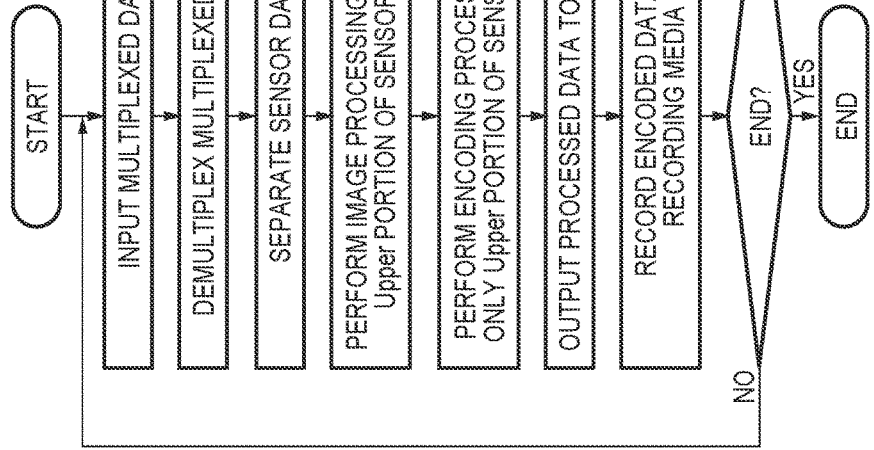
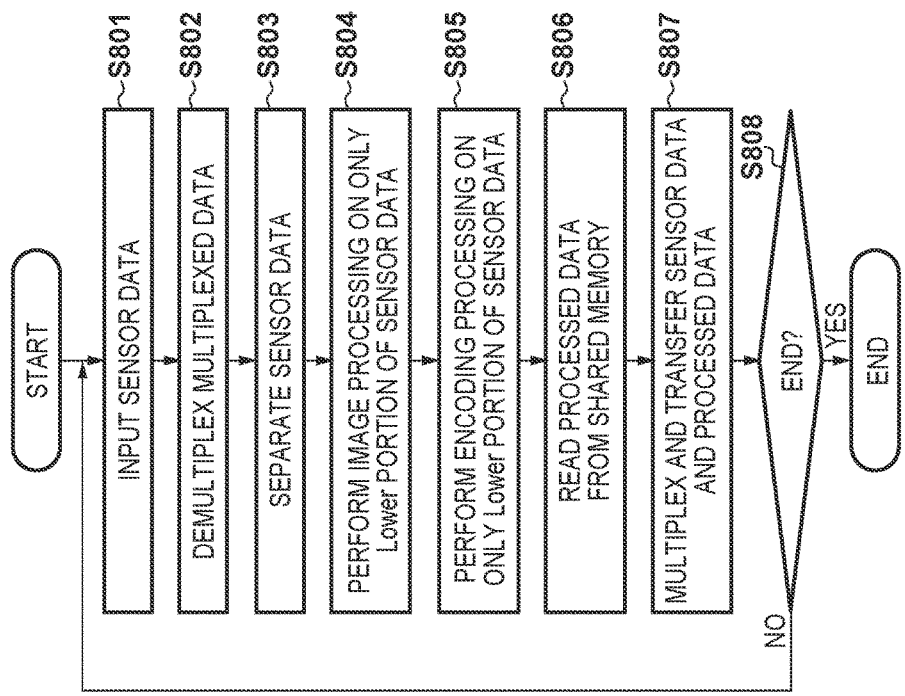

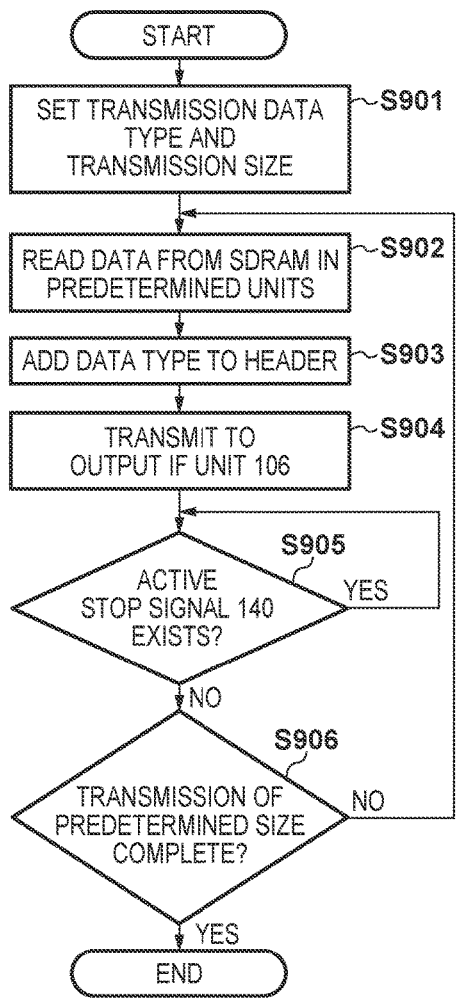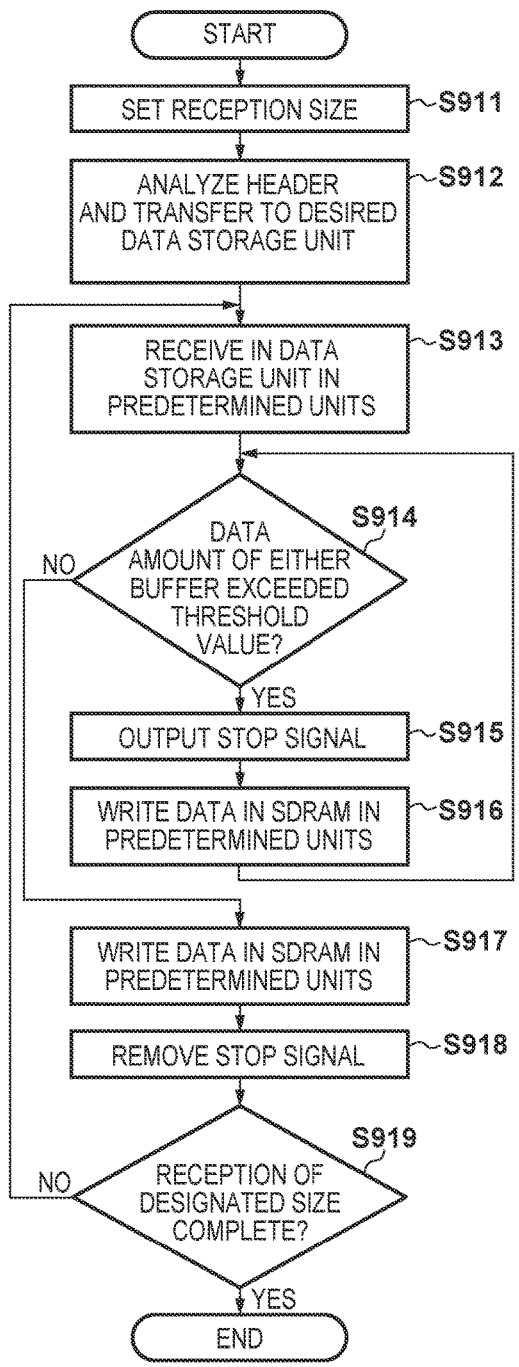
FIG. 9A
FIG. 9B

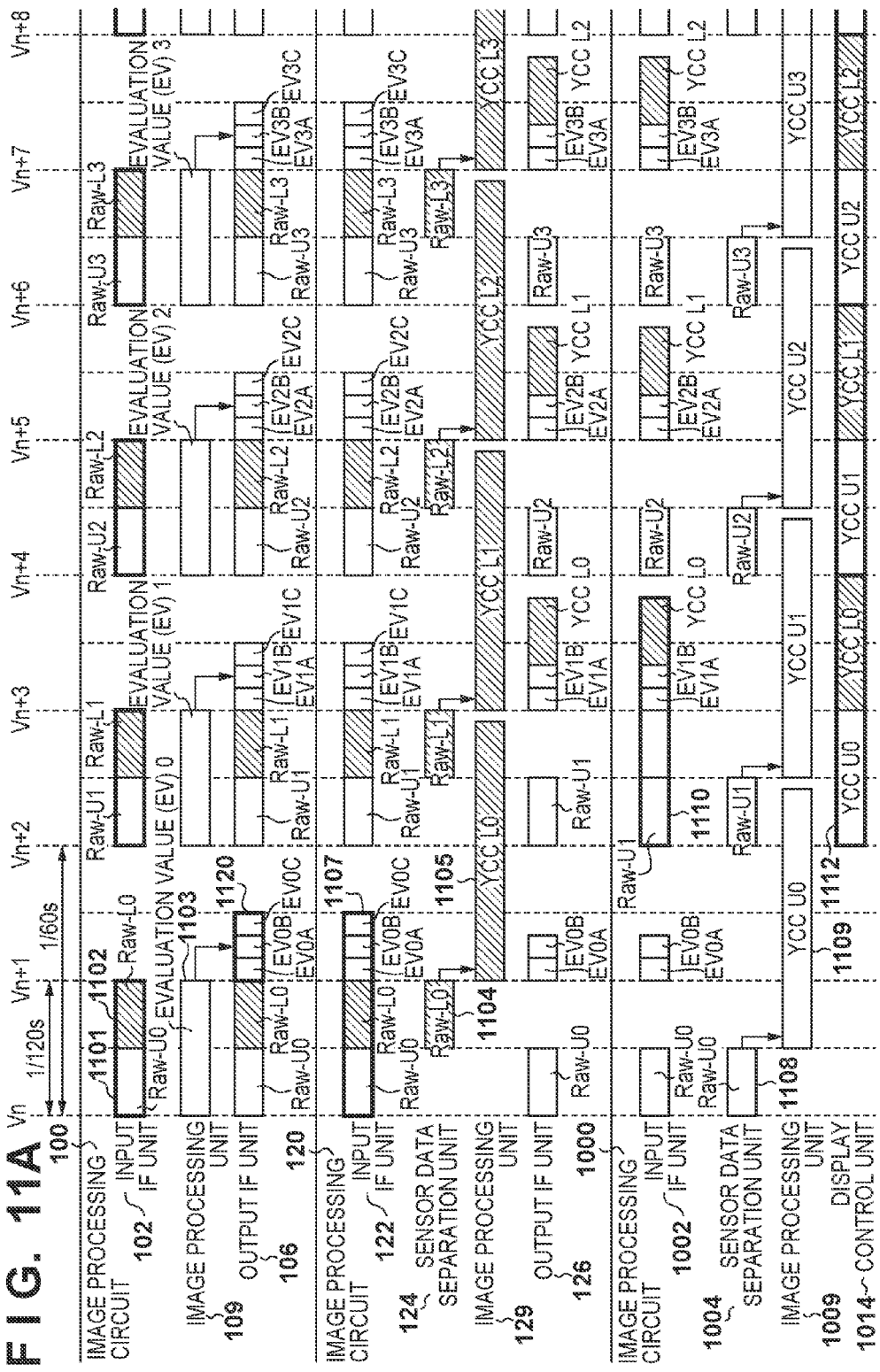

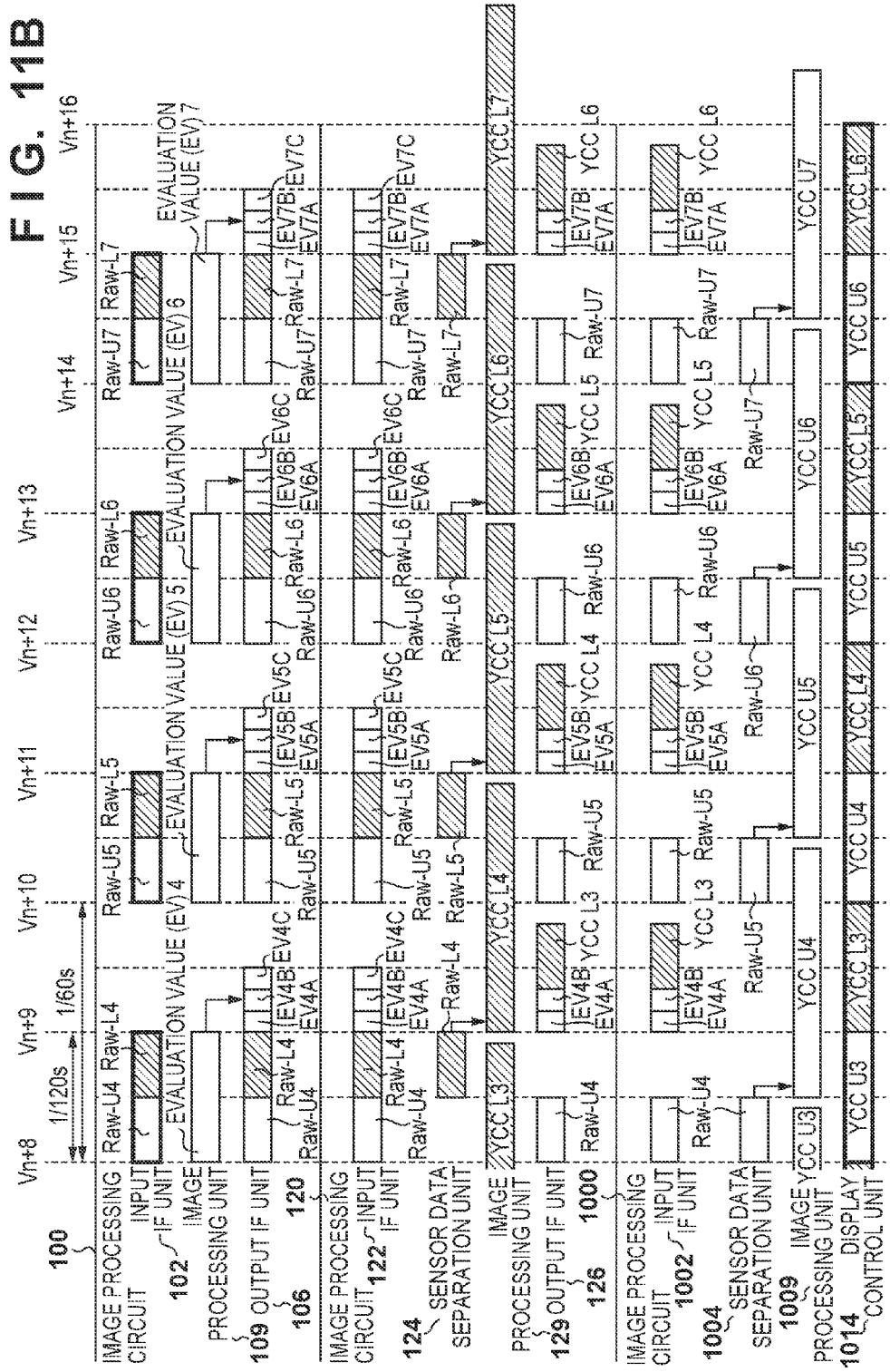

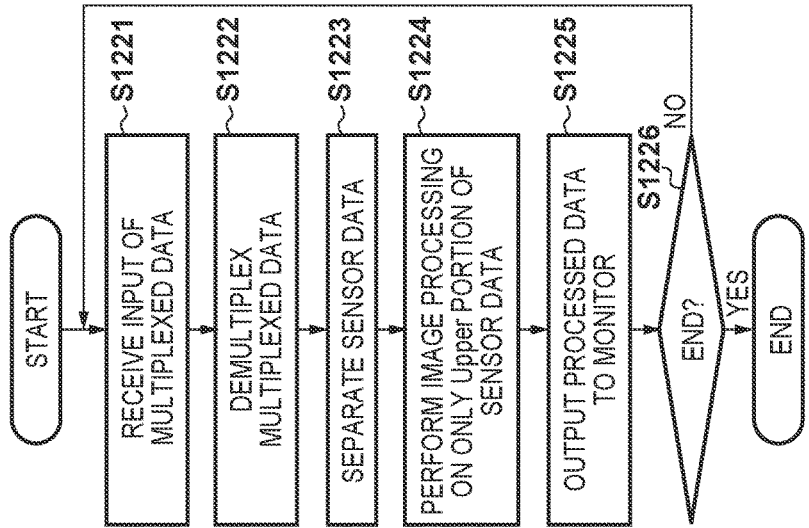
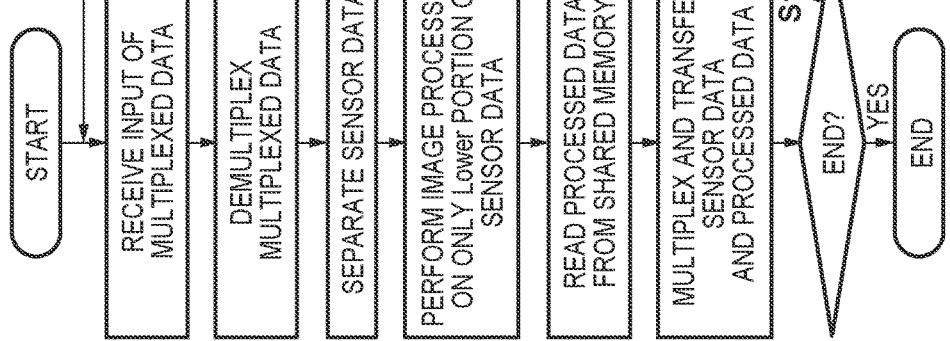
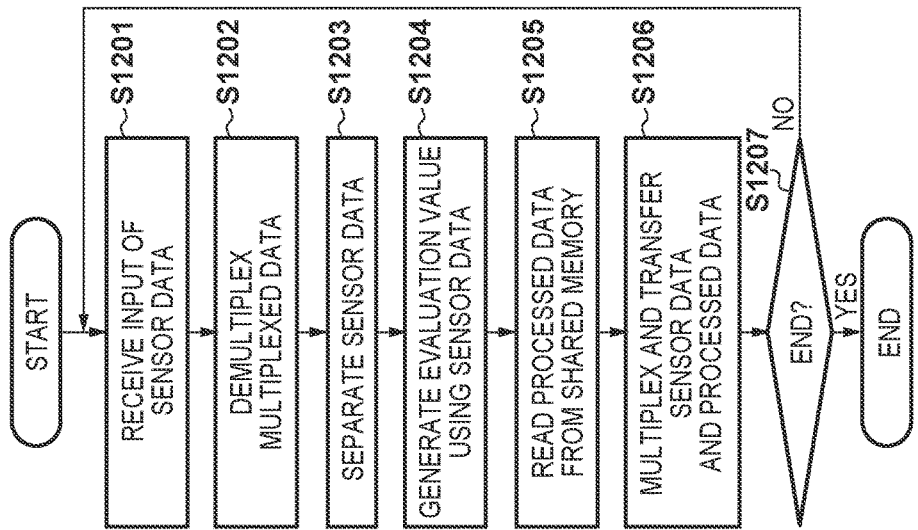
F I G. 12A   F I G. 12B   F I G. 12C

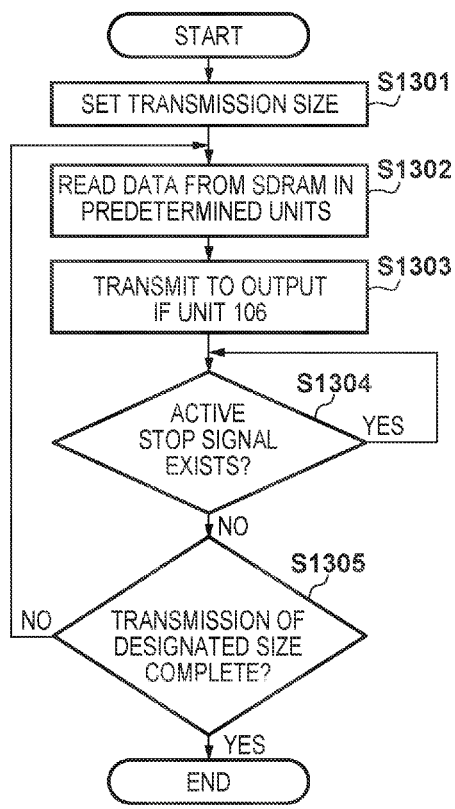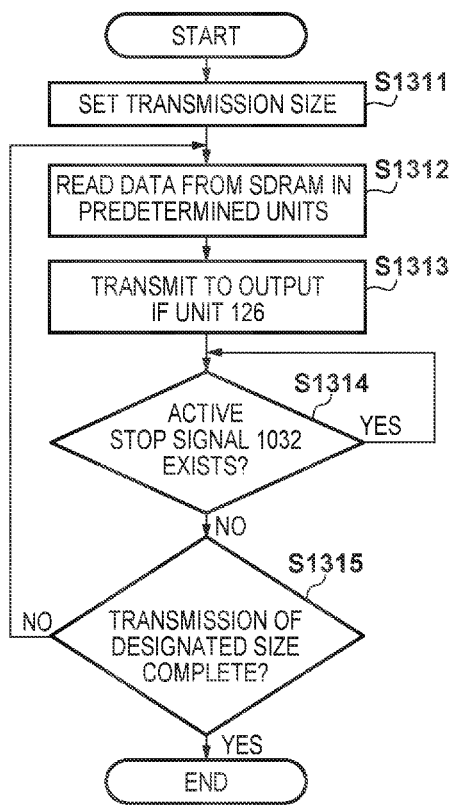

IMAGE PROCESSING APPARATUS

BACKGROUND OF THE INVENTION

Field of the Invention

The present invention relates to an image processing apparatus.

Description of the Related Art

In an image capturing apparatus such as a digital camera, a data amount processed by an image processing circuit increases accompanying an increase in pixels of an image capturing portion and an increase in a moving image frame rate. If the data amount increases, processing can no longer be performed by one image processing circuit, and therefore a method is known in which multiple image processing circuits are installed and processing is shared by the multiple image processing circuits (see Japanese Patent Laid-Open No. 2013-3986).

In Japanese Patent Laid-Open No. 2013-3986, a wire to image processing circuits is branched and the image processing circuits are arranged in parallel. With high-speed data transfer for transferring a large amount of data, signal integrity deteriorates when the wire is branched. With regard to this problem, solutions such as providing a dedicated relay device for dividing high-speed data transfer among multiple circuits, and providing a dedicated terminal for each destination exists, but they are costly.

SUMMARY OF THE INVENTION

The present invention provides an image processing apparatus that is low-cost and has high processing capability by providing a mechanism for flow control in a configuration in which multiple image processing circuits are connected in series.

An image capturing apparatus of the present invention has the following configuration.

According to the first aspect of the present invention, there is provided an image processing apparatus comprising: an image capturing unit; a first image processing circuit connected to the image capturing unit; and a second image processing circuit connected to the first image processing circuit, wherein a first memory is connected to the first image processing circuit and a second memory is connected to the second image processing circuit, the first image processing circuit includes: a separation unit configured to separate moving image data output from the image capturing unit into first data, which is a portion to be processed by the first image processing circuit, and second data, which is a portion to be processed by the second image processing circuit; a first image processing unit configured to carry out predetermined processing on the first data output from the separation unit and to store the processed first data in the first memory; a transmission unit configured to read out the first data processed by the first image processing unit from the first memory, multiplex the second data from the separation unit and the processed first data read out from the first memory, and transmit the multiplexed data to the second image processing circuit; and a first control unit configured to control the transmission unit, the second image processing circuit includes: a reception unit configured to receive the multiplexed data transmitted by the transmission unit and separate the multiplexed data into the second data and the processed first data; a storage unit configured to store the processed first data received by the reception unit in a buffer; a writing unit configured to read out the processed first data from the storage unit and store the processed first data in the second memory; a second image processing unit configured to carry out the predetermined processing on the second data received by the reception unit and store the processed second data in the second memory; and a detection unit configured to output a control signal to the first image processing circuit in response to a data amount of the processed first data stored in the buffer reaching a threshold value, and wherein the first control unit controls the transmission unit so as to stop transmission of the processed first data in response to the control signal from the detection unit.

According to the second aspect of the present invention, there is provided an image processing apparatus comprising: an image capturing unit; and a plurality of image processing circuits connected in series, wherein the plurality of image processing circuits carry out predetermined processing on moving image data obtained by the image capturing unit, one of the plurality of image processing circuits is connected to the image capturing unit, the plurality of image processing circuits each include: a reception unit configured to receive data including at least the moving image data obtained by the image capturing unit; a separation unit configured to acquire moving image data that is a portion to be processed by the image processing circuit from the moving image data received by the reception unit, the separation unit being configured to output moving image data that is a portion to be processed by a latter-stage image processing circuit if the moving image data received by the reception unit includes the moving image data that is the portion to be processed by the latter-stage image processing circuit; an image processing unit configured to carry out the predetermined processing on the moving image data, which is the portion that was acquired by the separation unit and is to be processed by the image processing unit, and store the resulting data in a memory; a storage unit configured to store data processed by a former-stage image processing circuit in a buffer if the data processed by the former-stage image processing circuit is included in the data received by the reception unit; a writing unit configured to read out the data processed by the former-stage image processing circuit from the buffer and write the data in the memory; a detection unit configured to output a control signal to the former-stage image processing circuit in response to a data amount of data that was processed by the former-stage image processing circuit and stored in the buffer reaching a threshold value; a transmission unit configured to, if the latter-stage image processing circuit is connected, read out the data processed by the image processing unit from the memory, multiplex the moving image data, which is the portion that was output from the separation unit and is to be processed by the latter-stage image processing circuit, and the data from the memory that was processed by the image processing unit, and transmit the multiplexed data to the latter-stage image processing circuit, the transmission unit being configured to transmit the data processed by the former-stage image processing circuit to the latter-stage image processing circuit as well in a case where the data processed by the former-stage image processing circuit is stored in the memory; and a control unit configured to control the transmission unit, wherein the control unit controls the transmission unit so as to stop transmission of the data processed by the image processing unit to the latter-stage image processing circuit in response to the control signal from the latter-stage image processing circuit.

According to the present invention, it is possible to provide an image processing apparatus and method that are low-cost and have high processing capability and according to which failure to receive processed data is prevented by providing a mechanism for flow control in a configuration in which multiple image processing circuits are connected in series, and an image capturing apparatus.

Further features of the present invention will become apparent from the following description of exemplary embodiments with reference to the attached drawings.

BRIEF DESCRIPTION OF THE DRAWINGS

FIG. 2 is a timing diagram illustrating control timing according to the first embodiment.

FIGS. 4A and 4B are flowcharts illustrating flow control according to the first embodiment.

FIGS. 8A and 8B are flowcharts illustrating a series of control according to the second embodiment.

FIGS. 9A and 9B are flowcharts illustrating flow control according to the second embodiment.

FIGS. 11A and 11B are timing diagrams illustrating control timing according to the third embodiment.

FIGS. 12A, 12B, and 12C are flowcharts illustrating a series of control according to the third embodiment.

FIGS. 13A, 13B, and 13C are flowcharts illustrating flow control according to the third embodiment.

DESCRIPTION OF THE EMBODIMENTS

Embodiment 1

Figure 1:
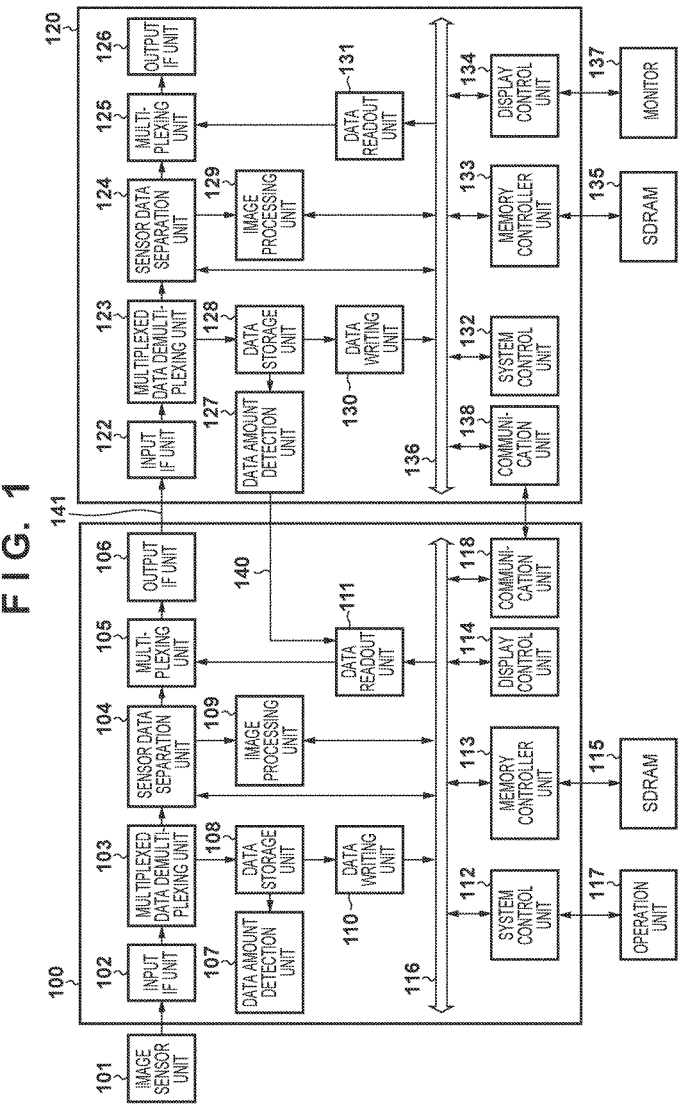
FIG. 1 is a block diagram showing a configuration of an image capturing apparatus according to a first embodiment.

FIG. 1 is a block diagram showing a configuration of an image capturing apparatus (or an image capturing system) according to a first embodiment. The image capturing apparatus of the present embodiment includes two image processing circuits 100 and 120 that are connected in cascade in series on a path for image data. The image processing circuits 100 and 120 have the same circuit configuration, and for example, the respective circuits can be provided using identical semiconductor chips. Note that the targets of processing and the like can be changed using parameter settings and the like, for example. As viewed from an image processing circuit, the upstream side of a cascade connection is referred to as "former-stage", and the downstream side is referred to as "latter-stage". Also, with the image capturing apparatus shown in FIG. 1, one screen obtained using an image capturing unit 101 is 3840 pixels wide×2160 pixels high (a 4K2K image) and a moving image of 60 frames per second (fps) is processed using two image processing circuits. The image processing units 100 and 120 each have the capability of processing a moving image that is 3840 pixels wide×2160 pixels high at 30 fps. In other words, they each have the capability of processing a moving image that is 3840 pixels wide×1080 pixels high at 60 fps.

In view of this, with the present embodiment, the upper half and lower half of each frame of the moving image are processed by the respective image processing units. The upstream-side image processing unit 100 retrieves image data that is a portion to be processed by the image processing unit 100 in the moving image data from the image capturing unit 101, and transmits the rest to the downstream-side image processing unit 120. Furthermore, the image processing unit 100 multiplexes the processed moving image data processed by the image processing unit 100 with unprocessed moving image data to be transmitted to the image processing unit 120 and transmits the resulting data via the same transmission path. Also, the image processing units 100 and 120 are each constituted as a single semiconductor integrated circuit (LSI) chip and have the same configuration as each other. In the present embodiment, a configuration is used in which the image capturing unit 101 and multiple image processing circuits are thus connected in series. Image data is output from the image capturing unit 101 at a frame size (number of pixels per frame) corresponding to the sensor size (number of pixels of the sensor) and at a predetermined frame rate. For this reason, it is possible that the data from upstream will somehow fail to be received by the image processing circuit. In view of this, in the present embodiment, failure to receive the data from upstream is prevented by providing a flow control mechanism that controls the data flow.

First Image Processing Unit 100

First, the image processing unit 100 will be described. In the image capturing apparatus, the image capturing unit 101 performs photoelectric conversion on a subject image and outputs digital image data of a predetermined size at a predetermined rate. An input IF unit 102 receives the image data output from the image capturing unit 101 as input data. A multiplexed data demultiplexing unit 103 demultiplexes the input data into the data output from the image capturing unit 101 and the later-described processed data. That is, the data is allocated to the output destination corresponding to the distribution of processing, as processed data and data to be processed in the future. A sensor data separation unit 104 separates the image data (sensor data) output from the image capturing unit 101 into data to be processed by the former-stage image processing unit 100 and data to be processed by the latter-stage image processing unit 120 and writes the data to be processed by the image processing unit 100 in an SDRAM 115 via a memory bus 116 and a memory controller unit 113. That is, the sensor data is allocated according to the image data of the respective portions whose processing the multiple image processing circuits 100 and 120 are in charge of. An image processing unit 109 reads out the data that was separated by the sensor data separation unit 104 and written in the SDRAM 115 and performs pixel interpolation, filter processing, resizing processing such as reduction, color conversion processing, and developing processing such as processing for converting into a YCbCr type of format, which is a format that is optimal for storing as compressed image data, for example. Also, the image processing unit 109 stores the processed image data in the SDRAM 115 via the memory bus 116 and the memory controller unit 113. The SDRAM 115 is a large-capacity memory capable of storing moving image data of multiple frames in a non-compressed state. The SDRAM 115 is constituted as a semiconductor integrated circuit separate from the image processing circuit 100.

In response to access requests from multiple bus masters, the memory controller unit 113 selects one bus master according to a pre-set priority level and controls data transmission between the bus master and the SDRAM 115. That is, the SDRAM 115 can be accessed by the multiple bus masters in a time-divided manner. The multiple bus masters include the image processing unit 109, a data writing unit 110, a data readout unit 111, a system control unit 112, and the like. The data readout unit 111 reads out the processed data processed by the image processing unit 109 from the SDRAM 115 via the memory controller unit 113 and transmits the processed data to a multiplexing unit 105.

The multiplexing unit 105 packetizes the processed data read out from the data readout unit 111 and the sensor data transmitted from the sensor data separation unit 104 at a predetermined size, adds headers for identification thereto, for example, subsequently multiplexes the packets by time division, and transmits the data from an output IF 106 to the latter-stage image processing unit. The packet configuration will be described later.

The system control unit 112 has a microcomputer (CPU), and controls the operation of the image processing unit 100 by executing a program recorded in a non-volatile memory (not shown). Also, the system control unit 112 performs overall control of the operations of the image capturing apparatus in accordance with instructions from an operation unit 117. The data storage unit 108 temporarily stores processed data demultiplexed by the multiplexed data demultiplexing unit 103. A data amount detection unit 107 detects whether or not the amount of data stored in the data storage unit 108 has exceeded a set threshold value, and if the threshold value has been exceeded, outputs a stop signal to the outside. The data writing unit 110 writes the processed data held in the data storage unit 108 in the SDRAM 105. A stop signal is a signal for interrupting the readout of data (and the transmission of the read-out data) and can also be referred to as an interrupt signal.

The operation unit 117 includes a power source switch, another switch for a user to operate, and the like. A communication unit 118 performs communication with another image processing circuit. For example, the content of communication includes communication of control system data that is not image data, such as transmission of set parameters.

Note that with the image processing circuit 100, processed data is not input from the input IF unit 102, and therefore the data storage unit 108 for storing the processed data, the data writing unit 110, and the data amount detection unit 107 are not used. Also, the image data (moving image data) output from the image capture unit 101 is output without being packetized. In other words, the image capturing unit 101 reads out and outputs the image data of the pixels in a Raster scanning sequence, in sequence starting from the upper-left pixel on one screen of an image sensor (not shown) of the image capturing unit. For this reason, the system control unit 112 controls the input IF unit 102 such that the received image data is output as-is. Also, since display of the processed image data is performed by the latter-stage image processing circuit 120, the display control unit 114 is not used.

Packet Configuration

A header and payload configuration at a time when the multiplexing unit 105 performs packetization will be described with reference to FIGS. 14A and 14B. A payload 1402 is processed data or sensor data. The payload 1402 is obtained by dividing in transmission units, which are 256 bytes in the present embodiment. A header 1401 includes information indicating the type of the data included in the payload of the packet including the header. In the present embodiment, the header 1401 has a 4-byte configuration and is defined as follows:

FFFF0100h: Processed data
FFFF0200h: Sensor data

Sensor data is unprocessed image data output from the image capturing unit 101. Reference numeral 1403 indicates a configuration in which packets are multiplexed. The multiplexing unit 105 generates this kind of header. Also, the multiplexing unit 105 adds the header to a payload including sensor data from the sensor data separation unit 104 or processed data output from the data readout unit 111 to generate a packet and outputs the packet from the output IF 106.

Image Processing Circuit 120

The image processing circuit 120 will be described next. The transmission path 141 connects the output IF unit 106 and the input IF unit 122. In the present embodiment, SLVS (Scalable Low Voltage Signaling) is used as an example. The input IF unit 122 receives multiplexed data output from the output IF unit 106 of the former-stage image processing circuit 100. The multiplexed data demultiplexing unit 123 identifies the sensor data and the processed data by referencing the identification information in the headers illustrated in FIG. 14A and performs demultiplexing. The sensor data separation unit 124 separates sensor data to be processed by the image processing circuit 120 from the sensor data output from the multiplexed data demultiplexing unit 123 and writes the data to be processed by the image processing circuit 120 in an SDRAM 135 via the memory bus 136 and the memory controller unit 133. The image processing unit 129 reads out the data that was separated by the sensor data separation unit 124 from the SDRAM 135, and performs pixel interpolation, filter processing, resizing processing such as reduction, color conversion processing, and developing processing such as processing for converting into a YCbCr type of format, which is a format that is optimal for storing as compressed image data, for example. The image processing unit 129 stores the processed image data in the SDRAM 135 via the memory bus 136 and the memory controller unit 133. The SDRAM 135 is a large-capacity memory capable of storing moving image data of several frames in a non-compressed state. The SDRAM 135 is constituted as a semiconductor integrated circuit separate from the image processing circuit 120. Also, in the present embodiment, the SDRAM 115 and the SDRAM 135 are constituted as separate semiconductor integrated circuits.

In response to access requests from multiple bus masters, the memory controller unit 133 selects one bus master according to a pre-set priority level and controls data transmission between the bus master and the SDRAM 135. The multiple bus masters include the image processing unit 129, a data writing unit 130, a data reading unit 131, a system control unit 132, a display control unit 134, and the like. The data storage unit 128 temporarily stores processed data demultiplexed by the multiplexed data demultiplexing unit 123. The data writing unit 130 writes the processed data stored in the data storage unit 128 in the SDRAM 115. A data amount detection unit 127 detects whether or not the amount of data stored in the data storage unit 128 has exceeded a set threshold value, and if the amount of data stored in the data storage unit 128 has exceeded the threshold value, outputs a stop signal 140 to the outside. The data readout unit 111 of the image processing circuit 100 controls data readout from the SDRAM 115 according to the stop signal 140. The display control unit 134 reads out the image data resulting from developing processing via the memory bus 136 and the memory controller unit 133 and outputs it to the monitor 137. The system control unit 132 has a microcomputer (CPU) and controls the operation of the image processing circuit 120 by executing a program recorded in a non-volatile memory (not shown). A communication unit 138 performs communication with another image processing circuit. With the configuration shown in FIG. 1, the communication unit 138 performs communication with the communication unit 118 of the image processing circuit 100. Note that since the image processing circuit 120 is at the final stage, the data readout unit 131, the multiplexing unit 125, and the output IF 126, which are circuit blocks for performing output to a downstream stage, are not used.

Description of Use Case

A use case for displaying an image captured by the image capturing unit 101 on the monitor 137 will be described with reference to FIG. 2 and FIGS. 3A and 3B. FIG. 2 is a timing chart up to when the sensor data output by the image capturing unit 101 is displayed on the monitor 137. The vertical axis indicates types of processing and the horizontal axis indicates the time. The period from Vn to Vn+1 is a period of capturing a one-frame image using the image capturing unit 101, and in the present embodiment, it is 1/60 of a second. The periods following Vn+1 are each similarly a period of capturing one frame. The input IF unit 102 receives input of the 4K2K 60-fps sensor data output from the image capturing unit 101. Data 201 to 209 is data to be displayed on the monitor 137. Note that the processing capability of the image processing units 109 and 129 of the image processing circuits of the present embodiment is 4K2K at 30 fps, and therefore the processing is shared by these two image processing units to achieve display of 4K2K moving images at 60 fps.

Figure 3A:
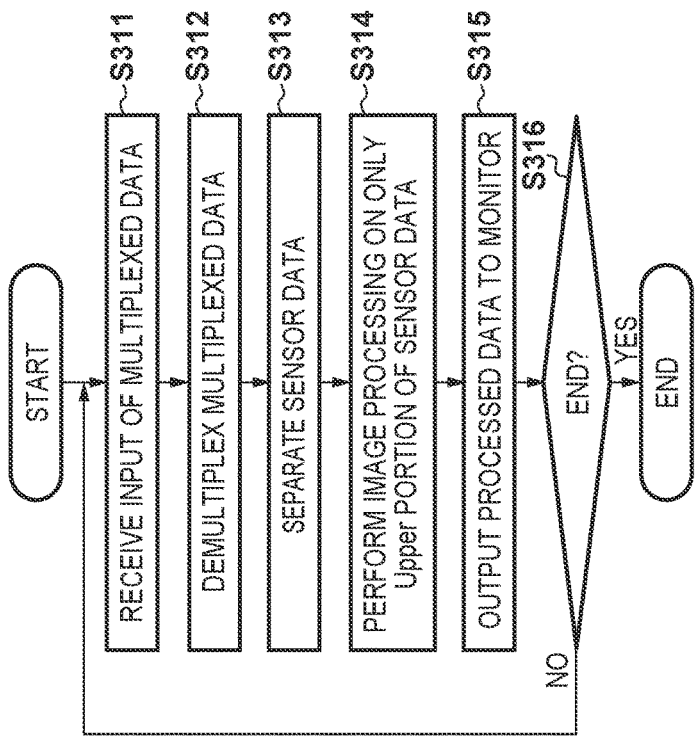
FIGS. 3A and 3B are flowcharts illustrating a series of control according to the first embodiment.
Figure 3B:
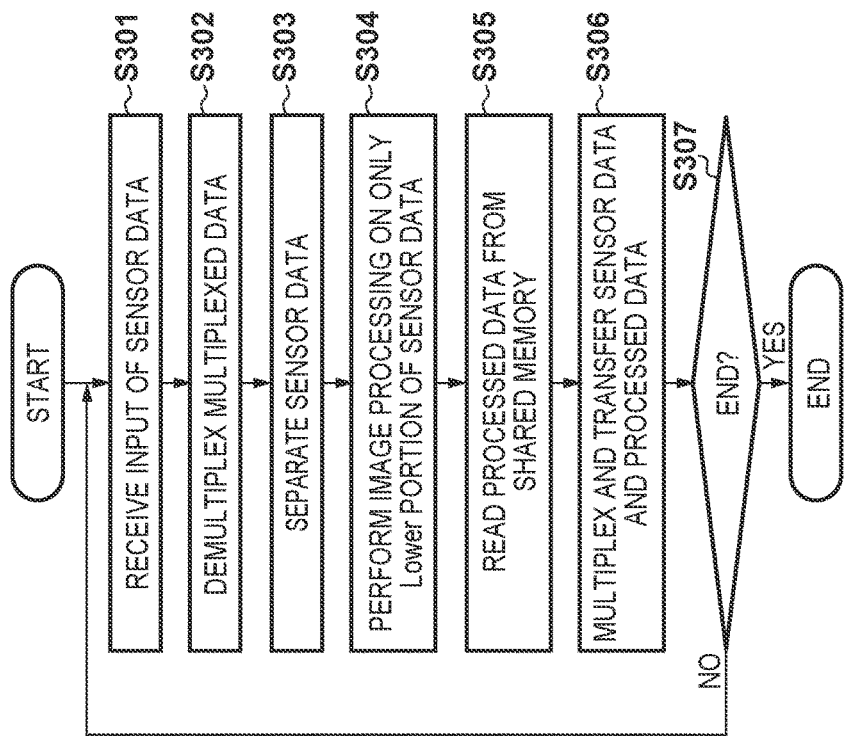

FIGS. 3A and 3B are flowcharts illustrating processing for displaying the sensor data output by the image capturing unit 101 on the monitor 137. Steps S301 to S307 shown in FIG. 3A indicate processing performed by the image processing circuit 100, and steps S311 to S316 shown in FIG. 3B indicate processing performed by the image processing circuit 120.

Image Processing Circuit 100

First, the processing flow of the image processing circuit 100 will be described with reference to FIG. 3A. In step S301, the input IF unit 102 receives the sensor data output by the image capturing unit 101. The data input between Vn and Vn+1 is Raw-U0 201 and Raw-L0 204 shown in FIG. 2. These respectively correspond to the upper half and lower half of one frame of the 4K2K moving image data, identification of data is for convenience, and no particular distinction is made in the sensor data. In step S302, the multiplexed data demultiplexing unit 103 demultiplexes the data input by the input IF unit 102 into the processed data and the sensor data. Note that the image data input to the image processing circuit 100 is sensor data and no processed data is included.

In step S303, the sensor data separation unit 104 separates the sensor data 204 to be subjected to image processing by the image processing unit 109 from the input sensor data and writes the sensor data 205 to be processed by the image processing unit 109 in the SDRAM 115. The sensor data 201, which remains after the separation, is transmitted to the latter-stage image processing circuit 120. The data 205 in FIG. 2 is sensor data written in the SDRAM 115. In the present embodiment, in order to perform distributed processing using the image processing circuits 100 and 120, as indicated by reference numerals 201a and 204a in FIG. 6B, the moving image data of each frame of 4K2K moving image data is divided into an upper side having a size of 4K1K in the upper half, and a lower side having a size of 4K1K in the lower half, the lower side being processed by the image processing circuit 100, and the upper side being processed by the latter-stage image processing circuit 120. That is, the image processing circuits each process 4K1K sensor data.

In step S304, the image processing unit 109 reads out the lower-side sensor data that was written in the SDRAM 115 in step S303, performs predetermined processing as described above, generates image data in a YCbCr (hereinafter referred to as YCC as well) format, and writes it back in the SDRAM 115. As described above, because the image processing unit 109 has a 4K2K 30-fps processing capability, the image processing unit 109 can perform image processing on 4K1K sensor data of 60 fps. Processing 206 shown in FIG. 2 indicates a timing of reading out from the SDRAM 115, performing image processing, and writing back in the SDRAM 115.

In step S305, the data readout unit 111 reads out the processed data processed in step S304 from the SDRAM 115 and transmits it to the multiplexing unit 105.

In step S306, the multiplexing unit 105 packetizes the processed data read out in step S305 and the remaining sensor data 201 from which the data 205 was separated in step S303 at a predetermined size, adds a header including identification information to each packet including the payload. Subsequently, the multiplexing unit 105 multiplexes the packets, and transmits the packets to the input IF unit 122 of the latter-stage image processing circuit 120 via the output IF unit 106. The data 207 shown in FIG. 2 indicates a timing of transmitting demultiplexed upper-side sensor data and processed data. The sensor data of the upper half of the frames of the foregoing period (Vn to Vn+2) does not include processed data to be multiplexed, and therefore only the sensor data is transmitted (Raw-U0, Raw-U1).

In step S307, the system control unit 112 determines whether or not there is ending processing such as changing the mode or turning off the image capturing apparatus, and if the processing is to be continued, the processing returns to step S301.

Image Processing Circuit 120

Next, the processing of the image processing circuit 120 will be described with reference to FIG. 3B. In step S311, the input IF unit 122 receives the multiplexed data output by the output IF unit 106. The data input in Vn to Vn+1 is the data 202 (Raw-U0) shown in FIG. 2, and the data input between Vn+2 and Vn+3 is the data 207 (Raw-U2 and YCC L0) shown in FIG. 2.

Figure 14A:
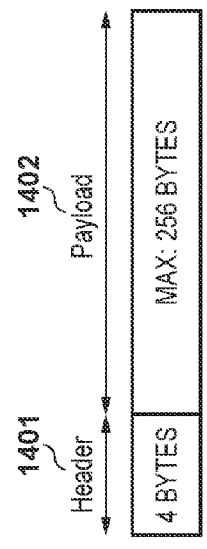
FIGS. 14A and 14B are diagrams illustrating a header and payload configuration packetized by the multiplexing unit in the first embodiment.
Figure 14B:
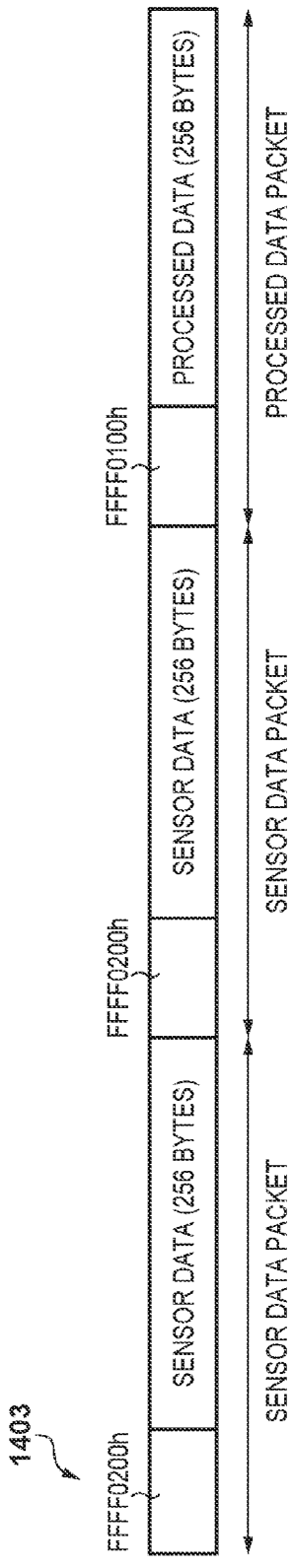

In step S312, the multiplexed data demultiplexing unit 123 identifies the processed data and sensor data input by the input IF unit 122 by referencing the identification information in the header illustrated in FIG. 14A, and performs demultiplexing.

In step S313, the sensor data separation unit 123 separates the sensor data output from the multiplexed data demultiplexing unit 123 into the sensor data to be subjected to image processing by the image processing unit 129, and the sensor data to be subjected to image processing by a latter-stage image processing circuit, and writes the sensor data to be subjected to image processing by the image processing unit 129 in the SDRAM 135. Reference numeral 203 in FIG. 2 indicates sensor data to be written in the SDRAM 135. Note that since no latter-stage image processing circuit is connected to the image processing circuit 120 in the configuration shown in FIG. 1, there is no sensor data that is to be demultiplexed.

In step S314, the image processing unit 129 reads out the upper-side sensor data that was written in the SDRAM 135 in step S313, performs predetermined processing as described above, generates image data in a YCbCr format, and writes it back in the SDRAM 135. Reference numeral 208 in FIG. 2 indicates a timing of reading out from the SDRAM 135, performing image processing, and writing back in the SDRAM 135.

In step S315, the display control unit 134 transmits the processed upper-side YCC data processed in step S315 and the processed lower-side YCC data input in step S311 to the monitor 137 and causes them to be displayed on the monitor. Reference numeral 209 in FIG. 2 indicates a timing of processing performed by the display control unit. Note that the processed lower-side YCC data input in step S311 may also be transmitted to the display control unit 134 after being temporarily stored in the RAM 135 and reconstructed into one frame of image data.

In step S316, the system control unit 112 determines whether or not there is ending processing such as changing the mode or turning off the image capturing apparatus, and if the processing is to be continued, the processing returns to step S311.

By performing the above-described procedure using the respective image processing circuits, the frames can be processed in a shared manner by the two image processing circuits, and moving image data with a large size and a high rate can be processed in real time. Here, in FIG. 2, since the image processing requires an amount of time that is a little less than the time of one frame (1/60 of a second), the sensor data with which the processed data is multiplexed is sensor data that is delayed by two frames. Accordingly, the amount of delay varies depending on the amount of time needed for image processing.

Description of Flow Control

Next, flow control of processed data will be described with reference to FIGS. 4A and 4B. In the present embodiment, a stop signal is output from the image processing circuit on the image data reception side to the image processing circuit on the transmission side so as to temporarily stop data transmission from the image processing circuit on the transmission side, and thereby flow control is realized. Steps S401 to S405 shown in FIG. 4A indicate processing performed on the transmission side (image processing circuit 100), and steps S411 to S418 shown in FIG. 4B indicate processing performed on the reception side (image processing circuit 120). Note that the processing of FIGS. 4A and 4B is executed repeatedly while the image capturing apparatus shown in FIG. 1 performs display processing.

Image Processing Circuit 100

First, the processing flow for the transmission side (image processing circuit 100) will be described with reference to FIG. 4A.

In step S401, the system control unit 112 sets the address and size of the data to be read out from the SDRAM 115 for the data readout unit 111. In step S402, the data readout unit 111 reads out the data at the designated address from the SDRAM 115 in predetermined units and transmits the data to the multiplexing unit 105. In the present embodiment, the predetermined unit is 256 bytes.

In step S403, the multiplexing unit 105 packetizes the sensor data of the sensor data separation unit 104 and the data from the SDRAM 115 transmitted in step S402 at a predetermined size, adds a header including the identification information to each packets including the payload. Subsequently, the multiplexing unit 105 multiplexes and transmits the packets to the output IF unit 106.

In step S404, the data readout unit 111 observes the stop signal 140 and determines whether or not the stop signal 140 is active. In the present embodiment, the determination is performed according to a level of the stop signal 140. If the stop signal is high level, the stop signal 140 is determined as being active. Note that making the stop signal 140 active is also referred to as outputting the stop signal 140. While the active stop signal is being detected, the data readout unit 111 repeats the processing of step S404 and does not perform readout from the SDRAM 115. That is, while the stop signal 140 is active, transmission of the data stored in the SDRAM 115 to the downstream image processing circuit 120 that is the transmission source of the stop signal 140 is stopped (or suppressed). The sensor data from the image capturing unit 101 is not stored in the SDRAM 115, and therefore is transmitted to the downstream image processing circuit 120 regardless of the state of the stop signal 140. If it is determined that the stop signal 140 is not active, the processing moves to step S405.

In step S405, the data readout unit 111 determines whether or not data of the size designated in step S401 has been transmitted, and if there is data that has not been transmitted, the processing returns to step S402, and the above-described processing is repeated. If transmission of data of the designated size is complete, the processing ends.

Image Processing Circuit 120

Next, the processing of the reception side (image processing circuit 120) will be described with reference to FIG. 4B. In step S411, the system control unit 132 sets the reception size for the data writing unit 130.

In step S412, the data storage unit 128 receives the data that is to be written in the SDRAM 135 and was demultiplexed by the multiplexed data demultiplexing unit 123 in predetermined data size units. In the present embodiment, the predetermined data size is 256 bytes. In the present example, the data received by the data storage unit 128 is the processed image data received from the former-stage image processing circuit 100 (and an image processing circuit preceding that, if present). The data storage unit 128 has a buffer memory that can temporarily store received data, and in the present embodiment, the capacity thereof is 2 kilobytes. In step S413, the data amount detection unit 127 determines whether or not the data amount stored in the data storage unit 128 has exceeded a threshold value. In the present embodiment, the threshold value is 1.5 kilobytes. If the threshold value has been exceeded, the processing moves to step S414, and if not, the processing moves to step S416. Note that the threshold value may be a predetermined value that is fixed or the threshold value may be settable.

In step S414, the data amount detection unit 127 switches the stop signal 140 to active so as to temporarily stop the operation of the data readout unit 111 on the transmission side (the image processing circuit 100). The active signal is defined as described above.

In step S415, the data writing unit 130 writes the received data in the SDRAM 135. Here, bus arbitration performed by the memory controller unit 133 of the present embodiment is in a fixed priority level format. That is to say, if requests are issued from multiple bus masters simultaneously, the memory controller unit 133 accepts a request from a high-priority-level bus master and the other bus masters wait to access the SDRAM 135. In the present embodiment, the priority level of bus masters that require real-time processing, such as the display control unit 134, is set to be high, and there is a bus master with a higher priority level than the data writing unit 130. For this reason, if a high-priority-level bus master that requires real-time processing such as a display system occupies a band of the SDRAM 135, the data writing unit 130 waits for access to the SDRAM 135. In step S415 and beyond, the processing returns to step S413 and the above-described processing is repeated.

In step S416, the data writing unit 130 writes the data in the SDRAM 135. In step S417, the data amount detection unit 127 sets the stop signal 140 to Low, cancels the active state, and sets the stop signal 140 to a non-active state. In step S418, the data writing unit 130 determines whether or not data of the size designated in step S411 has been received, and if there is data that has not been received, the processing returns to step S412, and the above-described processing is repeated. If reception of data of the designated size is complete, the processing ends.

As described above, according to Embodiment 1, sensor data from the image capturing unit and processed data are multiplexed and transmitted in a time-divided manner on the same transmission path. Then, on the receiving side, the received processed data is temporarily stored in the data storage unit, and if the stored data amount exceeds a threshold value, an instruction is given to stop transmission of the processed data from the image processing circuit on the transmission side, and data transmission on the transmission side is temporarily stopped. This makes it possible to prevent failure to receive processed data also in the case where a high-priority-level bus master that requires a real-time processing such as a display system occupies a band of the SDRAM and the data writing unit waits to access the SDRAM. That is, transmission of the processed data from the image processing circuit on the transmission side is stopped so that the processed data stored in the data storage unit 128 does not overflow.

Note that although a timing chart was described with reference to FIG. 2, this is an example in the present embodiment, and there is no limitation to the type or processing timing of the data. In FIG. 2, if the transmission of the processed data is interrupted by the stop signal, for example, the data 207 is output at a timing after the timing shown in FIG. 2, at which the stop signal is canceled.

Also, the threshold value detected by the data amount detection unit 127 is an example in the present embodiment and is not intended to limit the threshold value. Also, although a packet configuration was described with reference to FIGS. 14A and 14B, it is an example in the present embodiment and there is no limitation on the packet configuration or the identification information of the header. Also, a memory device of other type than SDRAM 115, 135 can be used.

Embodiment 2

Next, a second embodiment of the present invention will be described. Embodiment 1 described a method of performing flow control in which if the capacity of data that is stored in the data storage unit 128 and has not been transmitted to the SDRAM 135 exceeds a threshold value (i.e., if the available capacity is less than or equal to a threshold value), the stop signal is made active, and transmission of the processed data is temporarily stopped. In the present embodiment, a priority level is given to data to be transmitted from the image processing circuit 100 to the image processing circuit 120, and an output timing of the stop signal is changed according to the priority level. By doing so, high-priority-level data (or priority data) is controlled such that data reception is less likely to be suppressed in comparison to low-priority-level data (or non-priority data). A method of band control for the SDRAM will be described without changing the priority of the bus masters of the data writing unit 130 and the data readout unit 111.

Figure 5:
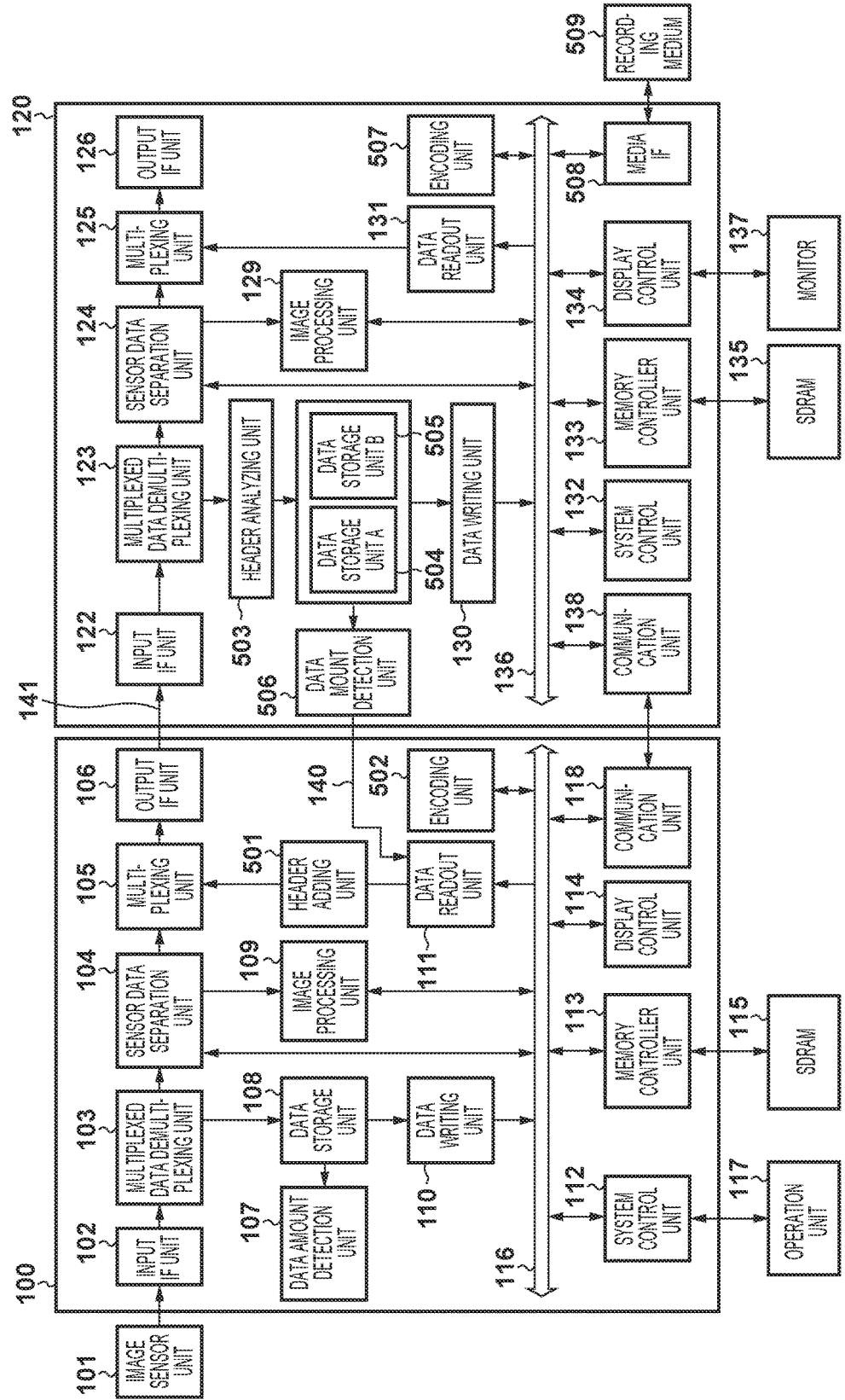
FIG. 5 is a block diagram showing a configuration of an image capturing apparatus according to second embodiment.

The overall system configuration according to the second embodiment will be described with reference to FIG. 5. Note that other than a header addition unit 501, an encoding unit 502, a header analyzing unit 503, a data storage unit A504, a data storage unit B505, a data amount detection unit 506, an encoding unit 507, a media IF 508, and a recording medium 509, the overall system configuration is similar to the configuration and operations described with reference to FIG. 1 in Embodiment 1, and therefore description thereof will not be included.

The header adding unit 501 generates a header indicating the priority level of the processed data from the data readout unit 111.

The encoding unit 502 reads out image data resulting from developing processing from the SDRAM 115 via the memory bus 116 and the memory controller unit 113, carries out known encoding processing such as JPEG or H.264 format, and thus compresses the information amount. Similarly, the encoding unit 507 also reads out image data resulting from developing processing from the SDRAM 135 via the memory bus 136 and the memory controller unit 133, carries out known encoding processing such as JPEG or H.264 format, and thus compresses the information amount.

The media interface (IF) 508 performs communication with the recording medium 509 via a connector (not shown) and transmits various types of commands and data to the recording medium 509 so as to record the encoded image data on the recording medium 509.

Description of Header

In the first embodiment, a configuration was used in which the multiplexing unit 105 generates the header, but in the second embodiment, two-stage processing is used in which the header adding unit 501 first adds the header, and thereafter the multiplexing unit modifies the header already added to the processed data by performing a logical OR operation (OR) on 4-byte data indicating the type of the data and the already added header. Hereinafter, the details of this processing will be described.

The header added by the header adding unit 501 and the payload configuration will be described with reference to FIG. 6A. The payload 602 indicates the data to be transmitted to the image processing circuit 120. The payload is obtained by dividing in transmission units, which are 256 bytes in the present embodiment. First, the header adding unit 501 adds a 4-byte header indicating the priority level of the processed data read out by the data readout unit 111 to the payload including the processed data and outputs the packet to the multiplexing unit 105. The headers added by the header adding unit 501 are defined as follows.

FFFF0001h: Priority data
FFFF0002h: Non-priority data

As described in Embodiment 1, the multiplexing unit 105 adds a header including identification information for identifying the sensor data and the processed data. However, in the present invention, a header corresponding to the priority level has already been added as described above to the processed data from the header adding unit 501. For this reason, the multiplexing unit 105 performs a logical OR operation (OR) on the header information of the packets of the processed data from the header adding unit 501 and the 4-byte data indicating the type of the data and modifies the header information as follows. Also, for the sensor data from the sensor data separation unit 104, the multiplexing unit 105 generates a header indicating sensor data and adds the header to the payload including the sensor data (see FIG. 15).

FFFF0101h: Processed data (priority data)
FFFF0102h: Processed data (non-priority data)
FFFF0200h: Sensor data The header analyzing unit 503 analyzes the header added by the header adding unit 501 and transmits the data to the data storage unit A504 or the data storage unit B505 according to the type of the data. The data storage unit A504 stores priority data. The data storage unit B505 stores non-priority data. The data amount detection unit 506 detects that a data amount has exceeded a threshold value using independent threshold values for the data storage unit A504 and the data storage unit B505 and activates the stop signal 140.

Description of Use Case

Next, a use case in which an image captured by the image capturing unit 101 is encoded and displayed on the monitor 137 while being recorded in the recording medium 509 will be described with reference to FIG. 7 and FIGS. 8A and 8B.

In the present embodiment,

YCbCr data for display on the monitor 137: Priority data
Encoded data to be recorded in the recording medium 509: Non-priority data Note that by storing the YCbCr data for display on the monitor 137 and the encoded data to be stored in the recording medium 509 in different regions in the SDRAM 115, for example, it is possible to perform readout with a distinction made between data types during readout as well. Also, based on the data type, it is possible for the header adding unit 501 to add a header indicating priority data or non-priority data to the data. Also, although a configuration was used in which the header adding unit 501 adds a header corresponding to the priority level of the data and the multiplexing unit 105 modifies the header according to the type of the data, the header adding unit 501 may be omitted. In this case, a configuration is used in which the multiplexing unit 105 generates three types of headers, namely headers for processed data (priority), processed data (non-priority), and sensor data, as described above, based on the priority level of the data from the data readout unit 111, and adds the header to the payload.

Figure 7:
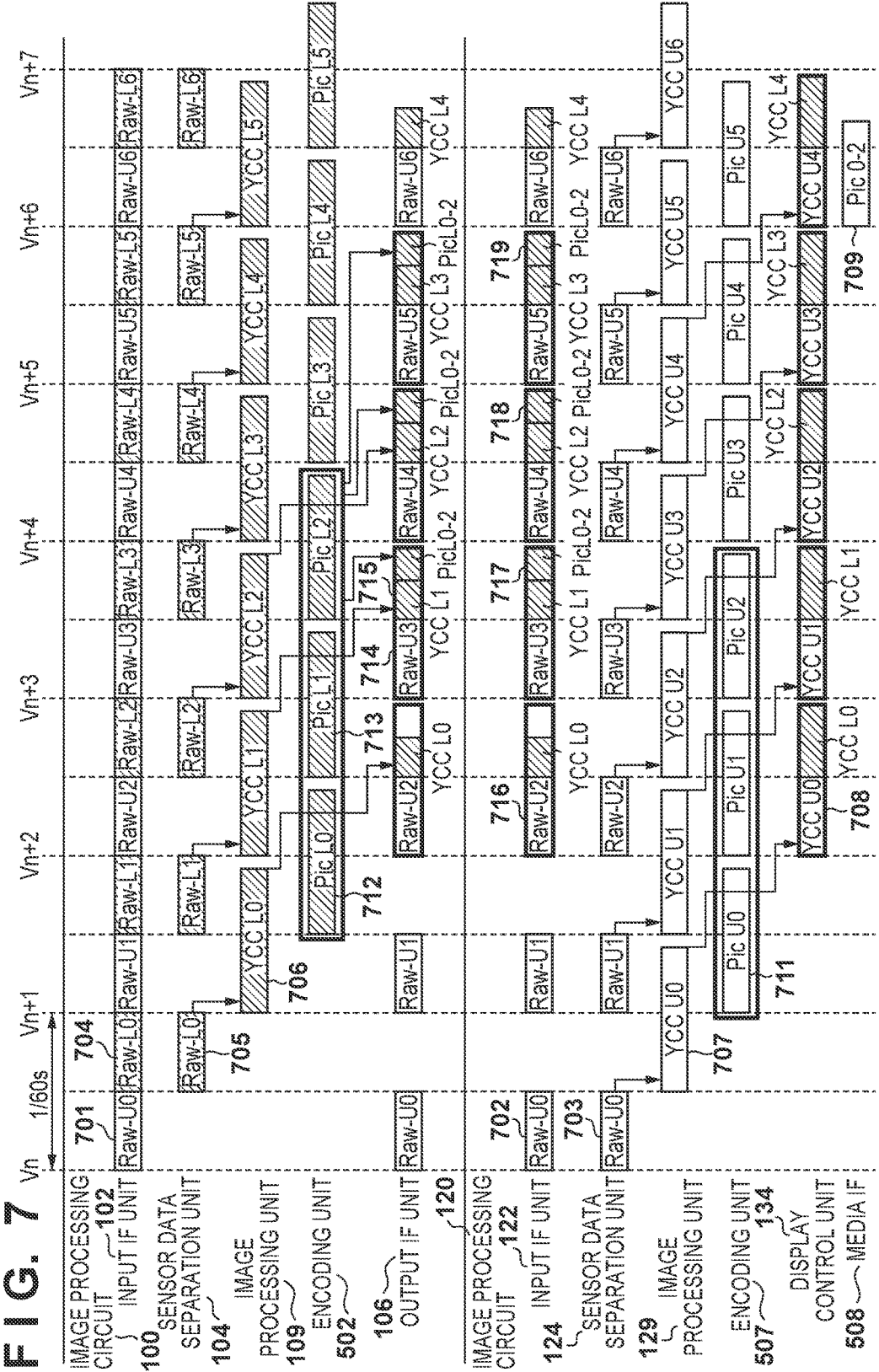
FIG. 7 is a timing diagram illustrating control timing according to the second embodiment.

FIG. 7 is a timing chart up to when the sensor data read out by the image capturing unit 101 is encoded and recorded in the recording medium 509 while being displayed on the monitor 137. The vertical axis indicates types of processing and the horizontal axis indicates the time. The period from Vn to Vn+1 is a period of capturing a one-frame image using the image capturing unit 101, and in the present embodiment, it is 1/60 of a second.

The input IF unit 102 receives the moving image data of 4K2K 60-fps (sensor data) output from the image capturing unit 101. Data 701 to 708 is data to be displayed on the monitor 137, and data 711 to 716 is data to be written in the recording medium 509 by the media IF 508. Note that the processing capability of the image processing units 109 and 129 of the image processing circuits of the present embodiment is 4K2K at 30 fps, and therefore the processing is shared by these two image processing units to achieve 4K2K at 60 fps.

FIGS. 8A and 8B are flowcharts illustrating processing for displaying the sensor data output by the image capturing unit 101 on the monitor 137 while encoding and storing it in the recording medium 509. Steps S801 to S808 shown in FIG. 8A indicate processing performed by the image processing circuit 100, and steps S811 to S818 shown in FIG. 8B indicate processing performed by the image processing circuit 120.

Image Processing Circuit 100

First, the processing flow of the image processing circuit 100 will be described with reference to FIG. 8A. In step S801, the input IF unit 102 receives the sensor data output by the image capturing unit 101. The data input between Vn and Vn+1 is Raw-U0 701 and Raw-L0 704 shown in FIG. 7. In step S802, the multiplexed data demultiplexing unit 103 demultiplexes the processed data and sensor data received by the input IF unit 102.

In step S803, the sensor data separation unit 104 separates the sensor data to be subjected to image processing by the image processing circuit 100 from the sensor data to be subjected to image processing by the latter-stage image processing circuit 120, and writes the sensor data to be subjected to image processing by the image processing circuit 100 in the SDRAM 115. The data 705 in FIG. 7 is sensor data written in the SDRAM 115. In the present embodiment, in order to divide the processing between the image processing circuits 100 and 120, each frame is divided into an upper side and a lower side, the upper side is processed by the latter-stage image processing circuit 120, and the lower side is processed by the image processing circuit 100. That is, the image processing circuits each process 4K1K sensor data.

In step S804, the image processing unit 109 reads out the lower-side sensor data that was written in the SDRAM 115 in step S803, subjects it to image processing to obtain YCbCr data, and writes it back in the SDRAM 115. Because the image processing unit 109 has a processing capability of 4K2K at 30 fps, the image processing unit 109 performs image processing on 4K1K sensor data of 60 fps. The processing 706 shown in FIG. 7 indicates a timing of reading out from the SDRAM 115, performing image processing, and writing back in the SDRAM 115.

In step S805, the encoding unit 502 reads out the image processed by the image processing unit 109 in step S804 from the SDRAM 115, executes the encoding processing, and thereafter stores the resulting image in the SDRAM 115. The processing 712 shown in FIG. 7 indicates a timing of reading out YCbCr data from the SDRAM 115, performing encoding processing, and writing back into the SDRAM 115. In FIG. 7, the written-back data is indicated as "Pic", the upper half/lower half of the frame is indicated using "U" or "L", and the frame number n is further added thereto. In the present embodiment, YCbCr data is used as the data for display and is therefore stored in a region different from that of the encoded data PicU/Ln. Also, the YCbCr data may be compressed, and an encoding method different from that of the encoded data may be used. Also, the YCbCr data for display may be compressed by thinning out the pixels in accordance with a common resolution of a display apparatus.

In step S806, the data readout unit 111 reads out the processed data processed in step S804 and step S805, or in other words, the YCbCr data and the encoded data, from the SDRAM 115, and transmits the data to the multiplexing unit 105. The YCbCr data for display is transmitted each VSync. The encoded data has a compressed data amount, and therefore the amount of time needed to transmit one frame worth of encoded data is shorter compared to that for the sensor data or the data for display. For this reason, regarding the encoded data, it is sufficient that three frames worth of encoded data Pic L0 to Pic L2 is transmitted as a bundle as indicated by the data 713 in FIG. 7 for example, and can be transmitted within a predetermined VSync (e.g., 3V). VSync is a vertical synchronization signal that indicates the start of a frame. 3V corresponds to a period corresponding to 3 frames (e.g., 3×1/60 of a second). In other words, half a frame worth of YCbCr data that was processed by the image processing circuit 100 is multiplexed with half a frame worth of unprocessed sensor data and is transmitted to the image processing circuit 120 frame by frame. On the other hand, the encoded data is multiplexed with the sensor data and transmitted to the downstream image processing circuit 120.

In step S807, the multiplexing unit 105 packetizes the processed data (YCC for display, encoded data) read out in step S806 and the sensor data separated in step S803 at a predetermined size, adds a header including identification information thereto. Subsequently, the multiplexing unit 105 multiplexes and transmits the resulting data to the input IF unit 122 of the latter-stage image processing circuit 120 via the output IF unit 106. Reference numerals 714 and 715 in FIG. 7 each indicate a timing of transmitting the demultiplexed upper-side sensor data and processed data (YCC for display, encoded data). In step S808, the system control unit 112 determines whether or not ending processing such as changing the mode or turning off the image capturing apparatus exists, and if the processing is to be continued, the processing returns to step S801.

Image Processing Circuit 120

Next, the processing of the image processing circuit 120 will be described with reference to FIG. 8B. In step S811, the input IF unit 122 receives the multiplexed data output by the output IF unit 106. The data input between Vn and Vn+1 is the data 702 shown in FIG. 7, and the data input between Vn+2 and Vn+3 is the data 716 (Raw-U2 and YCC L0) shown in FIG. 7.

Figure 15:
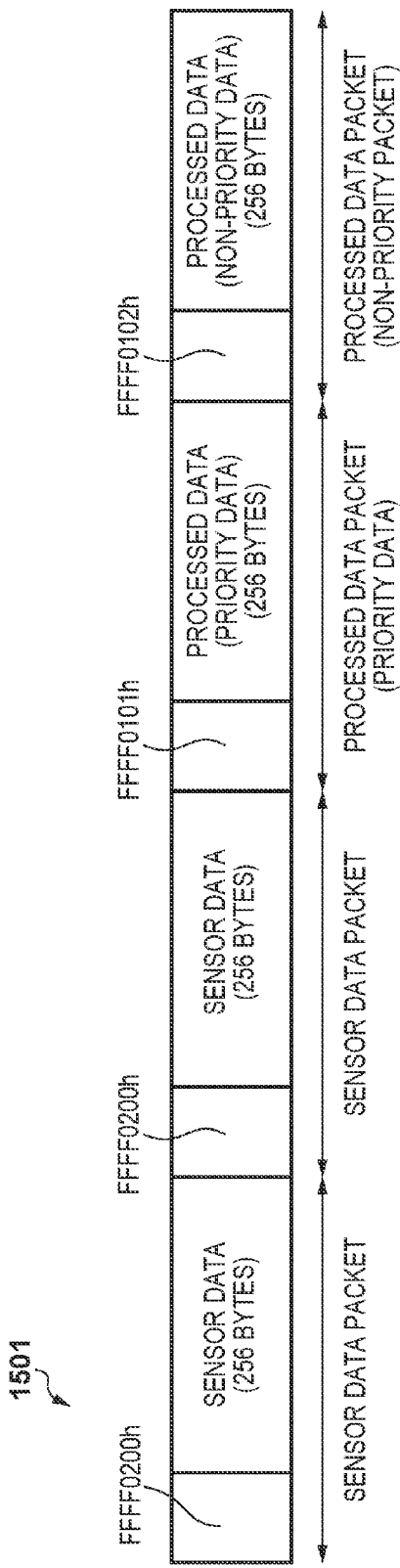
FIG. 15 is a diagram illustrating a header and payload configuration packetized by the multiplexing unit in the second embodiment.

In step S812, the multiplexed data demultiplexing unit 123 identifies the processed data and sensor data input by the input IF unit 122 by referencing the identification information in the header illustrated in FIG. 15, and performs demultiplexing.

In step S813, the sensor data separation unit 124 separates the sensor data that is to be subjected to image processing by the image processing circuit 120 from the sensor data that is to be subjected to image processing by a latter-stage image processing circuit, and writes the sensor data that is to be subjected to image processing by the image processing circuit 120 in the SDRAM 135. The data 703 in FIG. 7 is sensor data written in the SDRAM 135. Note that with the configuration shown in FIG. 5, the image processing circuit 120 is at the final stage, and therefore there is no image data to be processed downstream thereof.

In step S814, the image processing unit 129 reads out the upper-side sensor data that was written in the SDRAM 135 in step S813, performs processing, generates YCbCr data, and writes it back in the SDRAM 135. The processing 707 shown in FIG. 7 indicates a timing for reading out from the SDRAM 135, performing image processing, and writing in the SDRAM 135.

In step S815, the encoding unit 507 reads out the image data processed by the image processing unit 129 in step S804 from the SDRAM 135, executes the encoding processing, and thereafter writes the resulting image in the SDRAM 135. The processing 711 shown in FIG. 7 indicates a timing of reading out from the SDRAM 135, performing encoding processing, and writing in the SDRAM 135.

In step S816, the display control unit 134 transmits the processed upper-side YCbCr data that was processed in step S814 and the processed lower-side YCbCr data that was input in step S811 as one frame of image data, and displays it on the monitor 137. The data 708 of FIG. 7 is a timing for processing performed by the display control unit 134.

In step S817, the media IF 508 reads out the processed upper-side encoding data that was processed in step S815 and the processed lower-side encoding data that was input in step S811 from the SDRAM 135 and records it in the recording medium 509. The timing at which the reference numerals 711, 717, 718, and 719 in FIG. 7 are all present is the timing for recording in the recording medium 509, at which time the encoding data of frames 0 to 2 are recorded. In FIG. 7, the processing 709 that is performed after all of the necessary data is collected corresponds to the recording processing. In step S818, the system control unit 132 determines whether or not there is ending processing such as changing the mode or turning off the image capturing apparatus, and if the processing is to be continued, the processing returns to step S811.

Description of Flow Control

Next, flow control of processed data will be described with reference to FIGS. 9A and 9B. In the present embodiment, flow control is realized by outputting a stop signal from the reception side to the transmission side and temporarily stopping transmission on the transmission side. Steps S901 to S906 shown in FIG. 9A indicate processing for the transmission side (image processing circuit 100), and steps S911 to S919 shown in FIG. 9B indicate processing for the reception side (image processing circuit 120).

Image Processing Circuit 100

First, the processing flow for the transmission side (image processing circuit 100) will be described with reference to FIG. 9A. In step S901, the system control unit 112 sets the address, size, and data type of the data to be read out from the SDRAM 115 for the data readout unit 111. There are two data types, namely priority data and non-priority data. In step S902, the data readout unit 111 reads out the data at the designated address from the SDRAM 115 in predetermined data size units and outputs the data to the header adding unit 501. In the present embodiment, the predetermined data size is 256 bytes.

Figure 6A:
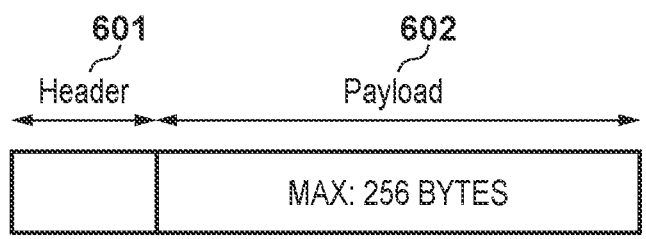
FIGS. 6A and 6B are diagrams showing a header configuration according to a second embodiment.
Figure 6B:
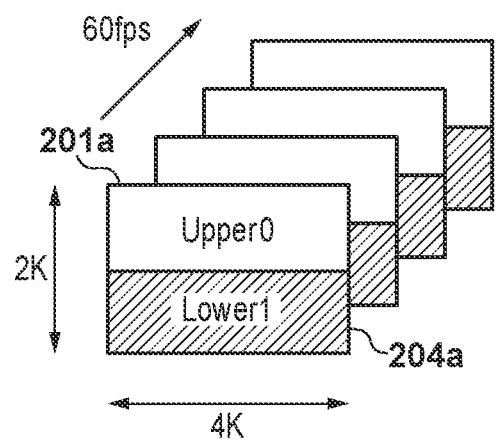

In step S903, the header adding unit 501 adds the header 601 indicating the data type described in FIG. 6A according to the data type designated in step S901. In step S904, the multiplexing unit 105 packetizes the sensor data of the sensor data separation unit 104 and the data from the SDRAM 115 transmitted in step S902 at a predetermined size, adds a header including the identification information to the payload, thereafter performs multiplexing, and transmits the packets to the output IF unit 106.

In step S905, the data readout unit 111 observes the stop signal 140 and determines whether or not the stop signal 140 is active. In the present embodiment, the determination is performed using a level of the stop signal 140. If the stop signal 140 is at the high level, it is determined as being active. While the active stop signal is being detected, the data readout unit 111 repeats the processing of step S905 and does not perform readout from the SDRAM 115. Also, while the active stop signal is being detected, the data readout unit 111 stops readout of both priority data and non-priority data. If it is determined that the stop signal 140 is not active, the processing moves to step S906.

In step S906, the data readout unit 111 determines whether or not data of the size designated in step S901 has been transmitted, and if there is data that has not been transmitted, the processing returns to step S902, and the above-described processing is repeated. If transmission of data of the designated size is complete, the processing ends.

Image Processing Circuit 120

Next, the processing for the reception side (image processing circuit 120) will be described with reference to FIG. 9B. In step S911, the system control unit 112 sets the reception size for the data writing unit 130.

In step S912, the header analyzing unit 503 analyzes the header of the processed data that was demultiplexed by the multiplexed data demultiplexing unit 123. Then, based on the header, the header analyzing unit 503 analyzes the priority level of the processed data and determines a storage destination according to the priority level. Priority data is transmitted to the data storage unit A504, and non-priority data is transmitted to the data storage unit B505.

In step S913, the data storage unit A504 receives priority data in predetermined units, and the data storage unit B505 receives non-priority data in predetermined units. In the present embodiment, the predetermined unit is 256 bytes. The data storage unit A504 and the data storage unit B505 can store the received data, and in the present embodiment, each can store 2 kilobytes.

In step S914, the data amount detection unit 506 determines whether or not the data amounts stored in the data storage unit A504 and the data storage unit B505 have exceeded respective threshold values. In the present embodiment, 1.25 kilobytes is used as the threshold value of the data storage unit A504 that stores the priority data, and 512 bytes is used as the threshold value of the data storage unit B505 that stores the non-priority data. If the data amount of either data storage unit exceeds a threshold value, the processing moves to step S915, and if neither exceeds a threshold value, the processing moves to step S917.

In step S915, the data amount detection unit 506 switches the stop signal 140 to active and temporarily stops the operation of the data readout unit 111 on the transmission side (the image processing circuit 100). The definition of "active" is as described above.

In step S916, the data writing unit 130 writes the data that was temporarily stored in the data storage unit 504 or 505 in the SDRAM 135. Here, bus arbitration performed by the memory controller unit 133 of the present embodiment is in a fixed priority level format. That is to say, if requests are issued from multiple bus masters simultaneously, the memory controller unit 133 accepts a request from a high-priority-level bus master and the other bus masters wait to access the SDRAM 135. In the present embodiment, the priority level of bus masters that require real-time processing, such as the display control unit 134, is set to be high, and there is a bus master with a higher priority level than the data writing unit 130. For this reason, if a high-priority-level bus master that requires real-time processing such as a display system occupies a band of the SDRAM 135, the data writing unit 130 waits for access to the SDRAM 135. In such a case, it is possible that the data amount that is temporarily stored in the data storage unit 504 or 505 will increase more and more, and the above-described threshold value will be exceeded. After step S916, the processing returns to step S914 and the above-described processing is repeated.

In step S917, the data writing unit 130 writes the data in the SDRAM 135. In step S918, the data amount detection unit 506 outputs the stop signal 140 at the low level and cancels the active state. In step S919, the data writing unit 130 determines whether or not data of the size designated in step S911 has been received, and if there is data that has not been received, the processing returns to step S912, and the above-described processing is repeated. If reception of data of the designated size is complete, the processing ends.

As described above, according to Embodiment 2, the reception-side data storage unit is divided into regions for data of different priority levels, namely a region for priority data and a region for non-priority data, and by changing the threshold value for the active output of the stop signal for each region, data with a high real-time property (priority data) and data with a low real-time property (non-priority data) can be transmitted using one bus master. Specifically, by raising the threshold value for priority data, the frequency of outputting the active stop signal decreases, and priority can be given to writing in the SDRAM. On the other hand, by lowering the threshold value for non-priority data, the frequency of outputting the active stop signal increases, transmission can be temporarily stopped to decrease access to the SDRAM, and another bus master can access the SDRAM.

Note that although a timing chart was described with reference to FIG. 7, this is an example in the present embodiment, and there is no limitation to the type or processing timing of the data. Also, the threshold value detected by the data amount detection unit 506 is an example in the present embodiment and is not intended to limit the threshold value. Also, although the packet configuration was described with reference to FIG. 15, this is an example in the present embodiment and there is no limitation to the packet configuration and the identification information in the header.

Embodiment 3

Figure 10A:
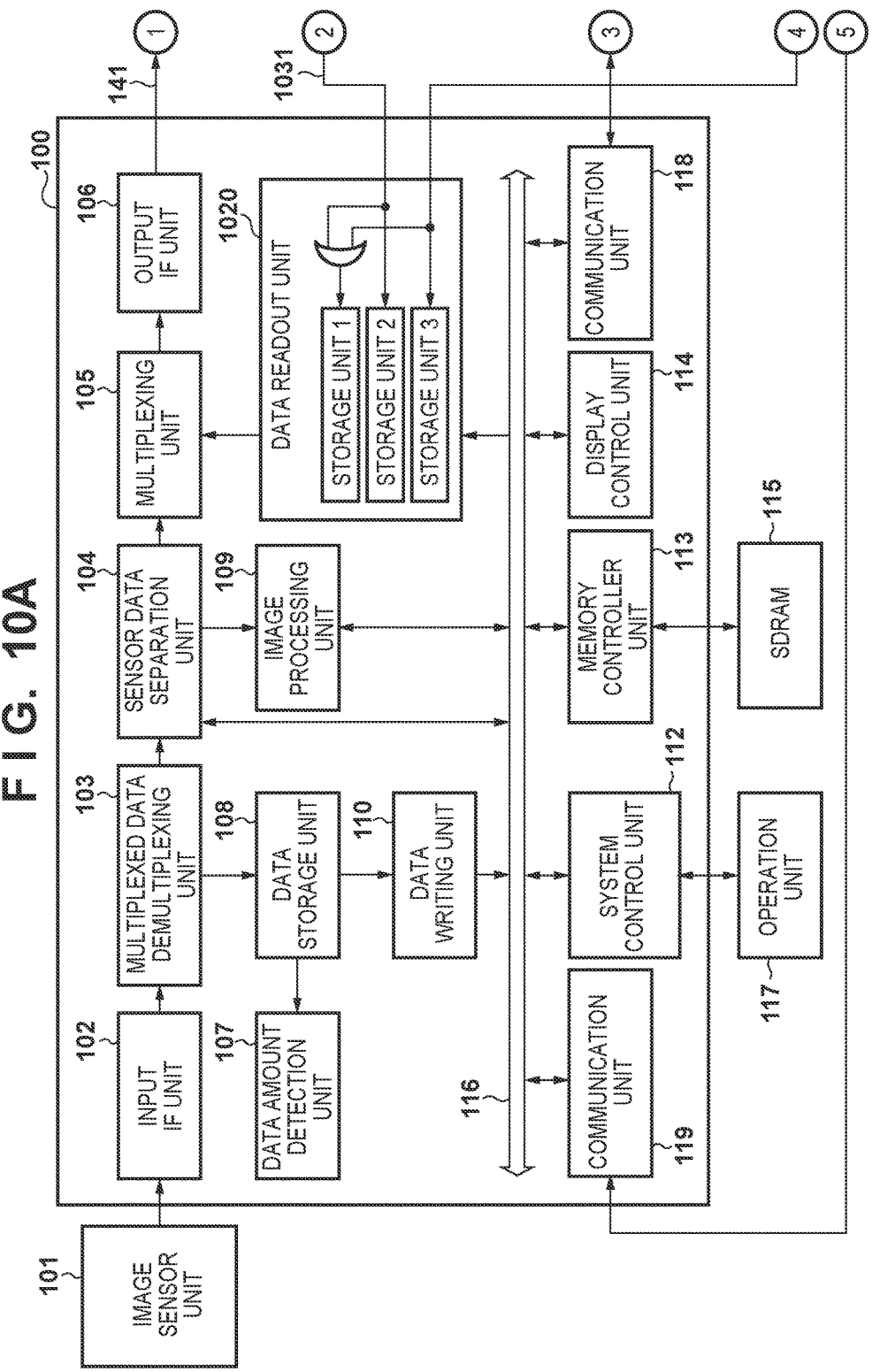
FIGS. 10A and 10B are block diagrams showing a configuration of an image capturing apparatus according to a third embodiment.
Figure 10B:
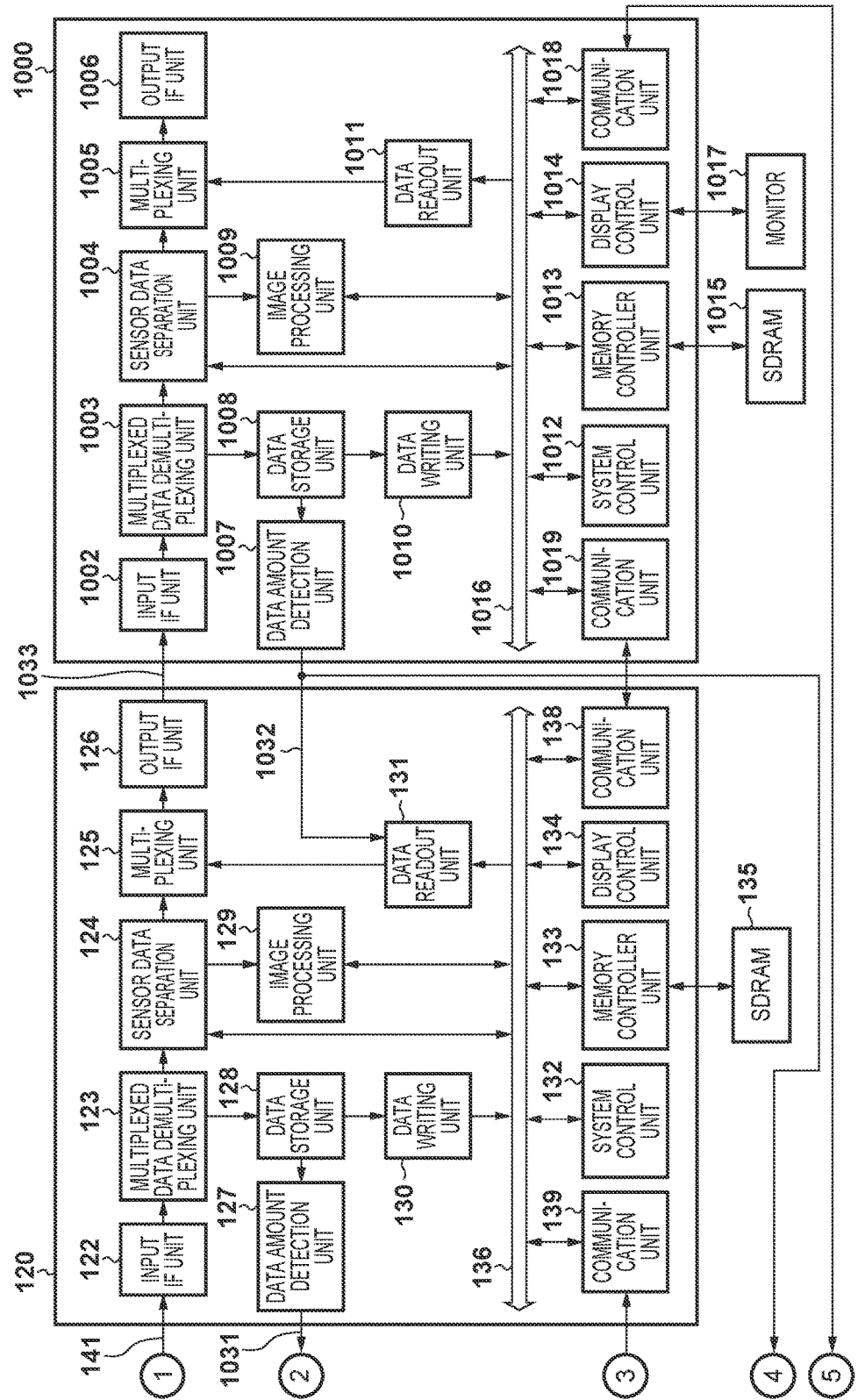

Next, a third embodiment of the present invention will be described. Embodiments 1 and 2 described a flow control method for a configuration in which two identical image processing circuits are connected in cascade. The present embodiment will describe flow control for an image capturing apparatus that includes three identical image processing circuits. An overall system configuration according to the third embodiment will be described with reference to FIGS. 10A and 10B (hereinafter referred to collectively as FIG. 10). The image capturing apparatus of the present embodiment has a configuration in which three image processing circuits are used.

Other than the data readout unit 1020 and the communication units 119 and 139, the configuration of the image processing circuits 100 and 120 is similar to the configuration and operations described with reference to FIG. 1 of Embodiment 1, and therefore description thereof will not be included here. Note that in the present embodiment, in the most-upstream image processing circuit 100, the image processing unit 109 performs sensor data developing processing and evaluation value calculation processing. Also, the image processing circuit 100 does not output the YCrCb data, which is data resulting from performing developing processing on the sensor data, but transmits the data of the evaluation value to the latter-stage image processing circuit 120. Also, the image processing circuit 100 transmits all of the sensor data from the image capturing unit 101 to the latter-stage image processing circuit 120. The communication units 119 and 139 are the same as the communication units 118 and 138 and are circuit blocks for performing communication between image processing circuits.

The data readout unit 1020 holds multiple storage units. In the present embodiment, the data readout unit 1020 holds the following three types of storage.

Storage unit 1: for simultaneous transmission to the image processing circuit 120 and the image processing circuit 1000.

Storage unit 2: for transmission to the image processing circuit 120.

Storage unit 3: for transmission to the image processing circuit 1000.

The storage unit to be used among these three storage units is determined according to a later-described setting of the data readout unit.

Also, the multiplexing unit 105 adds identification information of the transmission destination to the header of the packet. In the present embodiment, bit 19:16 is used as the identification information of the image processing circuit at the address, and is added as described below.

Transmission to the closest image processing circuit (to the image processing circuit 120)

FFFF1100h: Processed data

FFFF1200h: Sensor data

Transmission to the second-closest image processing circuit (to the image processing circuit 1000)

FFFF2100h: Processed data

FFFF2200h: Sensor data

Even if four or more image processing circuits are connected, this can be dealt with by similarly changing the identification information.

Next, the image processing circuit 1000 will be described. A transmission path 1033 connects the output IF unit 126 and the input IF unit 1002. In the present embodiment, SLVS (Scalable Low Voltage Signaling) is used as an example. The input IF unit 1002 receives multiplexed data output from the output IF unit 126 of the former-stage image processing circuit 120. The multiplexed data demultiplexing unit 1003 demultiplexes the multiplexed data into the sensor data and the processed data. The sensor data separation unit 1004 separates the data to be processed by the image processing circuit 1000 from the sensor data output from the multiplexed data demultiplexing unit 1003. On the data demultiplexed by the sensor data separation unit 1004, the image processing unit 1009 performs pixel interpolation, filter processing, resizing processing such as reduction, color conversion processing, and developing processing such as processing for converting into a YCbCr type of format, which is a format that is optimal for storing as compressed image data, for example, and writes the processed image in the SDRAM 1015 via the memory bus 1016 and the memory controller unit 1013. In response to access requests from multiple bus masters, the memory controller unit 1013 selects one bus master according to a pre-set priority level and controls data transmission between the bus master and the SDRAM 1015. The data storage unit 1008 temporarily stores processed data demultiplexed by the multiplexed data demultiplexing unit 1003. The data amount detection unit 1007 performs detection of whether or not the amount of data stored in the data storage unit 1008 has exceeded a set threshold value, and if it has, outputs a stop signal 1032 to the outside. The stop signal 1032 is input to the image processing circuit 100 and the image processing circuit 120. The data readout unit 1020 of the image processing circuit 100 and the data readout unit 131 of the image processing circuit 120 control readout of data from the SDRAM 115 and the SDRAM 135 according to the result of the stop signals 1032 and 1031.

The display control unit 1014 reads out the image data resulting from the developing processing from the SDRAM 1015 via the memory bus 1016 and the memory controller unit 1013 and outputs it to the monitor 1017.

The system control unit 1012 has a microcomputer (CPU) and controls the operation of the image processing circuit 1000 by executing a program recorded in a non-volatile memory (not shown).

Note that the image processing circuit 1000 and the image processing circuit 100 are connected by the communication unit 1018 and the communication unit 119, but if the image processing circuits 100 and 1000 communicate via the image processing circuit 120, this connection need not be included.

Description of Use Case

Next, a use case in which an image shot by the image capturing unit 101 is displayed on the monitor 1017 that is connected to the image processing circuit 1000 will be described with reference to FIGS. 11A, 11B, 12A, 12B, and 12C. In the present embodiment, the image processing circuit 100 generates an evaluation value. Image processing circuit 120 generates the lower-side YCbCr data. The image processing circuit 1000 generates the upper-side YCbCr data and generates and displays each frame of the display data based on the upper and lower YCbCr data.

In the present embodiment, three types of evaluation values are generated for each frame as described below.

Evaluation value A: exposure, white balance: used by image processing circuit 120 and image processing circuit 1000

Evaluation value B: distortion correction: used by image processing circuit 1000

Evaluation value C: distortion correction: used by image processing circuit 120

Note that evaluation values (or evaluation data) are generated for each frame, and adding the frame number to the front of the symbols A, B, and C, which indicate the items, indicates the correspondence with the frames. For example, the evaluation value A of frame 0 is expressed as evaluation value 0A.

FIGS. 11A and 11B (hereinafter referred to collectively as FIG. 11) are timing charts showing up to when the sensor data output by the image capturing unit 101 is processed and displayed on the monitor 1017. The vertical axis indicates types of processing and the horizontal axis indicates the time. The period from Vn to Vn+1 is a period of capturing a one-frame image using the image capturing unit 101, and in the present embodiment, it is $\frac{1}{120}$ of a second. The number of pixels of each frame of the moving image data from the image capturing unit 101 is 4K2K.

The input IF unit 102 inputs the 4K2K 120-fps sensor data output from the image capturing unit 101 in periods of $\frac{1}{60}$ of a second. Reference numerals 1101 to 1112 indicate data to be displayed on the monitor 1017.

Note that the processing capability of the image processing units 109 and 129 of the image processing circuits of the present embodiment is 4K2K at 30 fps, and therefore the processing is shared by these two image processing units to achieve 4K2K at 60 fps.

FIGS. 12A, 12B, and 12C are flowcharts illustrating processing for displaying the sensor data output by the image capturing unit 101 on the monitor 1017. Steps S1201 to S1207 shown in FIG. 12A show processing performed by the image processing circuit 100, steps S1211 to S1217 shown in FIG. 12B show processing performed by the image processing circuit 120, and steps S1221 to S1226 shown in FIG. 12C show processing performed by the image processing circuit 1000.

Image Processing Circuit 100

First, the transmission processing flow of the image processing circuit 100 will be described with reference to FIG. 12A. In step S1201, the input IF unit 102 receives sensor data output by the image capturing unit 101. The data input between Vn and Vn+1 is Raw-U0 1101 and Raw-L0 1102 shown in FIG. 11. In step S1202, the multiplexed data demultiplexing unit 103 demultiplexes the data input by the input IF unit 102 into the processed data and the sensor data input. In step S1203, the sensor data separation unit 104 separates the sensor data into the sensor data to be processed by the image processing circuit 100 and the sensor data to be processed by a latter-stage image processing circuit. In the present embodiment, the processing for the evaluation values is executed by the image processing circuit 100, and the processing for display, or in other words, YCrCb data generation processing is executed by the latter-stage image processing circuits 120 and 1000 for each frame.

In step S1204, the image processing unit 109 generates the evaluation value data A, B, and C of the frame based on the sensor data, and stores it in the SDRAM 115. Processing 1103 of FIG. 11 indicates the timing of performing evaluation value data generation processing and writing in the SDRAM 115. The image processing unit 109 acquires information indicating shooting conditions such as exposure and white balance from the image capturing unit 101, for example, and creates evaluation value data based on this information. Also, in order to correct distortion or tilting of an optical system of the image capturing unit 101, for example, an evaluation value for distortion correction is created based on a parameter or the like indicating a predetermined distortion, tilting, or the like.

In step S1205, the data readout unit 1020 reads out the evaluation value data (evaluation values 0A to 0C) processed in step S1204 from the SDRAM 115 and transmits the evaluation value data to the multiplexing unit 105. Processing 1120 in FIG. 11 indicates the timing of reading out the evaluation value data from the SDRAM 115. Note that the evaluation values A, B, and C are data such as parameters obtained as a result of processing original image data. For this reason, the data amount of the evaluation values is smaller compared to the data amount of the image data.

In step S1206, the multiplexing unit 105 packetizes the evaluation value data read out in step S1205 and the sensor data at a predetermined size, adds identification information to the header. Subsequently, the multiplexing unit 105, multiplexes and transmits the resulting packet to the input IF unit 122 of the latter-stage image processing circuit 120 via the output IF unit 106. In step S1207, the system control unit 112 determines whether or not ending processing such as changing the mode or turning off the image capturing apparatus exists, and if the processing is to be continued, the processing returns to step S1201. Note that in the present embodiment, the evaluation value A and the evaluation value B are used by both the image processing circuits 120 and 1000. For this reason, the multiplexing unit 105 transmits a packet obtained by adding a header indicating the image processing circuit 120 as the address and a packet obtained by adding a header indicating the image processing circuit 1000 as the address for the data of the evaluation value A and the evaluation value B.

Image Processing Circuit 120

Next, the transmission processing of the image processing circuit 120 will be described with reference to FIG. 12B. In step S1211, the input IF unit 122 receives the multiplexed data output by the output IF unit 106. The data input between Vn and Vn+2 is indicated by reference numeral 1107 in FIG. 11 (Raw-U0, RAW-L0, and evaluation values 0A to 0C).

In step S1212, the multiplexed data demultiplexing unit 123 identifies the processed data input by the input IF unit 122 and the sensor data by referencing the identification information of the header and performs demultiplexing. Here, the multiplexed data demultiplexing unit 123 separates the data addressed to the image processing circuit 120 from the processed data and transmits it to the data storage unit 128. Also, the processed data that is not addressed to the image processing circuit 120 (here, packets with an address indicating the image processing circuit 1000 among the evaluation value A and the evaluation value B) is not demultiplexed, but is transmitted to the sensor data separation unit 104 as-is. The data writing unit 130 reads out the processed data temporarily stored in the data storage unit 128 (here, the evaluation value A and the evaluation value C) and writes it in the SDRAM 135 via the memory controller unit 133. In step S1213, the sensor data separation unit 1214 separates the sensor data to be subjected to image processing by the image processing circuit 120 from the data from the multiplexed data demultiplexing unit 103 and writes the resulting data in the SDRAM 135. Also, the sensor data separation unit 104 transmits the sensor data to be subjected to image processing by the latter-stage image processing circuit 1000 and the processed data addressed to the image processing circuit 1000 (evaluation value data) to the multiplexing unit 105. Because the image processing unit 109 has a processing capability of 4K2K at 30 fps, the image processing unit 109 performs image processing on 4K1K sensor data of 60 fps. The data 1104 of FIG. 11 is the sensor data to be written in the SDRAM 135.

In step S1214, the image processing unit 129 reads out the lower-side sensor data written in the SDRAM 135 in step S1213. Also, the image processing unit 129 reads out the evaluation value data of the evaluation value 0A and the evaluation value 0C from the SDRAM 135 and performs processing of the sensor data using these pieces of evaluation value data. Then, the image processing unit 129 generates the YCbCr data and writes it back in the SDRAM 135. Reference numeral 1105 in FIG. 11 indicates the timing of reading out from the SDRAM 135, performing image processing, and writing in the SDRAM 135.

In step S1215, the data readout unit 131 reads out the processed data that was processed in step S1214 from the SDRAM 135 and transmits it to the multiplexing unit 125.

In step S1216, the multiplexing unit 125 packetizes the processed data read out in step S1215, the sensor data demultiplexed in step S1212, and the processed data addressed to the image processing circuit 1000 (evaluation value data) at a predetermined size, adds the header indicating the identification information. Subsequently, the multiplexing unit 125 multiplexes and transmits the packet to the input IF unit 1002 of the latter-stage image processing circuit 1000 via the output IF unit 126. The data to be multiplexed includes the evaluation value A and the evaluation value B, which are transmitted to the image processing circuit 1000 through the image processing circuit 120 without being used for processing in the image processing circuit 120. Reference numeral 1110 in FIG. 11 indicates the transmission timing of the demultiplexed upper-side sensor data Raw-U1 and the processed data (the evaluation value 1A and evaluation value 1B generated by the image processing circuit 100, and the lower-side display data YCC L0 processed by the image processing circuit 120). Note that the data YCC L0 is subjected to image processing based on the evaluation values 0A, 0B, and 0C received in Vn+1 to Vn+2.

In step S1217, the system control unit 132 determines whether or not there is ending processing such as changing the mode or turning off the image capturing apparatus, and if the processing is to be continued, the processing returns to step S1211.

Image Processing Circuit 1000

Next, reception processing performed by the image processing circuit 1000 will be described with reference to FIG. 12C. In step S1221, the input IF unit 1002 receives the multiplexed data output by the output IF unit 126. The data input between Vn+2 to Vn+4 is indicated by the reference numeral 1110 in FIG. 11 (Raw-U1, YCC L0, evaluation value 1A, and evaluation value 1B).

In step S1222, the multiplexed data demultiplexing unit 1003 identifies the processed data and the sensor data input by the input IF unit 1002 by referencing the identification information in the header and demultiplexes them. The multiplexed data demultiplexing unit 1003 separates the processed data addressed to the image processing circuit 1000 from the input data and transmits it to the data storage unit 1008. The data writing unit 1010 reads out the processed data stored temporarily in the data storage unit 1008 and writes it in the SDRAM 1015 via the memory controller unit 1013.

In step S1223, the sensor data separation unit 1004 separates the sensor data into the sensor data to be subjected to image processing by the image processing circuit 1000 and the sensor data to be subjected to image processing by a latter-stage image processing circuit and writes the sensor data to be subjected to image processing by the image processing circuit 1000 in the SDRAM 1015. The data 1108 of FIG. 11 is the sensor data to be written in the SDRAM 1015. Also, because there is no latter-stage image processing circuit, the received sensor data is substantially the target of processing performed by the image processing circuit 1000.

In step S1224, the image processing unit 1009 reads out the upper-side sensor data written in the SDRAM in step S1223. Also, the image processing unit 1009 reads out the evaluation value data of the evaluation value A and the evaluation value B from the SDRAM 1015 and uses them to process the sensor data. Also, the image processing unit 1009 generates the YCC image data and stores it in the SDRAM 1015. Reference numeral 1109 in FIG. 11 indicates the timing of reading out from the SDRAM 1015, performing image processing, and writing in the SDRAM 1015.

In step S1225, the display control unit 1014 transmits the processed upper-side YCC data processed in step S1224 and the processed lower-side YCC data input in step S1221 to the monitor 1017 and displays it on the monitor 1017. Reference numeral 1112 in FIG. 11 indicates the timing of processing performed by the display control unit.

In step S1226, the system control unit 1012 determines whether or not ending processing such as changing the mode or turning off the image capturing apparatus exists, and if the processing is to be continued, the processing returns to step S1221.

Description of Flow Control

Next, flow control for processed data will be described with reference to FIGS. 13A, 13B, and 13C. In the present embodiment, a stop signal is output from the reception-side image processing circuit 1000 to the transmission-side image processing circuits 100 and 120, causing the transmission of the transmission side to stop temporarily, and thereby flow control is realized. Steps S1301 to S1305 shown in FIG. 13A indicate processing of the transmission side 1 (image processing circuit 100), steps S1311 to S1315 shown in FIG. 13B indicate processing of the transmission side 2 (image processing circuit 120), and steps S1321 to S1329 shown in FIG. 13C indicate processing of the reception side (image processing circuit 1000).

Image Processing Circuit 100

First, the processing of the transmission side 1 (image processing circuit 100) will be described with reference to FIG. 13A. In step S1301, the system control unit 112 sets the address, size, and transmission destination of the data to be read out from the SDRAM 115 for the data readout unit 1020. The data readout unit 1020 changes the storage unit (buffer) to be used as described below according to the transmission destination of the data designated by the system control unit 112.

Storage unit 1: for simultaneous transmission to the image processing circuit 120 and the image processing circuit 1000.

Storage unit 2: for transmission to the image processing circuit 120.

Storage unit 3: for transmission to the image processing circuit 1000.

In the present embodiment as well, the data readout unit 1020 adds a header for identifying the transmission destination (address) and type of data to the packet and transmits the packet. Note that the present embodiment will describe a use case of performing simultaneous transmission to the image processing circuit 120 and the image processing circuit 1000.

In step S1302, the data readout unit 1020 reads out the data at the designated address from the SDRAM 115 in predetermined units and temporarily stores the data read out from the SDRAM 115 in one of the storage units 1 to 3. The data readout unit 1020 stores the data read out from the SDRAM 115 in the storage unit corresponding to the transmission destination of the readout data among the storage units 1 to 3. Also, the data readout unit 1020 reads out the data from the storage units 1 to 3 and transmits the data to the multiplexing unit 105. In the present embodiment, the predetermined unit is 256 bytes. The evaluation values 0A to 0C of the reference numeral 1120 in FIG. 11 correspond to the period from Vn to Vn+2.

In step S1303, the multiplexing unit 105 generates packets of a predetermined size using the sensor data output from the sensor data separation unit 104 and the data from the SDRAM 115 that was transmitted in step S1302, adds a header including the identification information. Subsequently, the multiplexing unit 105 multiplexes and transmits the packets to the output IF unit 106.

In step S1304, the data readout unit 1020 determines whether or not the stop signal 1031 and the stop signal 1032 are active. In the present embodiment, the data readout unit 1020 determines whether or not the stop signals are active according to level of the stop signal. If the stop signal is at a high level, it is determined as being active. The stop signal 1031 corresponds to the storage unit 2, and the stop signal 1032 corresponds to the storage unit 3. If simultaneous transmission is set for the image processing circuit 120 and the image processing circuit 1000 in step S1301, a logical OR of the stop signals 1031 and 1032 corresponds to the storage unit 1. While the active stop signal is being detected, the data readout unit 1020 repeats the processing of step S1304, and the data to be transmitted using the corresponding storage unit is not read out from the SDRAM 115. For example, if the stop signal 1031 is active, readout from the SDRAM 115 of data to be transmitted using the storage unit 1 and the storage unit 2 is stopped, but readout of data to be transmitted using the storage unit 3 is continued. If the stop signal 1032 is active, readout from the SDRAM 115 of data to be transmitted using the storage unit 1 and the storage unit 3 is stopped, and readout of data to be transmitted using the storage unit 2 is continued. If both signals are active, all readout is stopped. That is, transmission of processed data corresponding to the image processing circuit that is the transmission source of the stop signal is suppressed. If it is determined that neither the stop signal 1031 nor the stop signal 1032 is active, the processing moves to step S1305.

In step S1305, the data readout unit 1020 determines whether or not data of the size determined in step S1301 has been transmitted, and if there is data that has not been transmitted, the processing returns to step S1302, and the above-described processing is repeated. If transmission of data of the designated size is complete, the processing ends.

Image Processing Circuit 120

Next, the processing of the transmission side 2 (image processing circuit 120) will be described with reference to FIG. 13B.

In step S1311, the system control unit 132 sets the address and size of the data to be read out from the SDRAM 135 for the data readout unit 131. In step S1312, the data readout unit 131 reads out the data at the designated address from the SDRAM 135 in predetermined units and transmits the data to the multiplexing unit 125. In the present embodiment, the predetermined unit is 256 bytes. YCC L0 indicated by reference numeral 1105 in FIG. 11 corresponds to the period between Vn+2 to Vn+3.

In step S1313, the multiplexing unit 125 packetizes the sensor data output from the sensor data separation unit 124 and the data from the SDRAM 135 that was transmitted in step S1312 at a predetermined size, adds the header including identification information. Subsequently, the multiplexing unit 125 multiplexes and transmits the packets to the output IF unit 126.

In step S1314, the data readout unit 131 observes the stop signal 1032 to determine whether or not the stop signal 1032 is active. While the active stop signal is being detected, the data readout unit 131 repeats the processing of step S1314 and does not perform readout from the SDRAM 135. If it is determined that the stop signal 1032 is not active, the processing moves to step S1315.

In step S1315, the data readout unit 131 determines whether or not data of the size designated in step S1311 has been transmitted, and if there is data that has not been transmitted, the processing moves to step S1312, and the above-described processing is repeated. If transmission of data of the designated size is complete, the processing ends.

Image Processing Circuit 1000

Finally, processing of the reception side (image processing circuit 1000) will be described with reference to FIG. 13C. In the present embodiment, the storage size of the data storage unit 1008 is 2 kilobytes.

In step S1321, the system control unit 1012 sets a threshold value as described below based on the number of stages of the upstream (alternatively may include the image processing circuit 1000 itself) image processing circuits.

Two chips (two stages): 1.5 kilobytes (2 kilobytes–256 bytes×2)

Three chips (three stages): 1.0 kilobytes (2 kilobytes–256 bytes×2×2 chips)

Four chips (four stages): 512 bytes (2 kilobytes–256 bytes×2×3 chips)

When an active stop signal is output to the upstream image processing circuit, the threshold value is changed according to the number of stages in the upstream image processing circuit that is connected, in order to make it possible to receive the already-transmitted data. For example, in the case of using a configuration in which the three image processing circuits 100, 120, and 1000 are included as in FIG. 10, if 256-byte data has already been transmitted from the image processing circuit 100 and 256-byte data has already been transmitted from the image processing circuit 120 as well when the stop signal is made active, it is necessary to be able to receive a total of 512 bytes of data. In order to be able to receive 512 bytes and to have leeway for reception, the threshold is set to 1.0 kilobytes. In step S1322, the system control unit 1012 sets the reception size for the data writing unit 1010.

In step S1323, the data storage unit 1008 receives, in predetermined units, the data that was demultiplexed by the multiplexed data demultiplexing unit 1003 and is to be written in the SDRAM 1015. In the present embodiment, the predetermined unit is 256 bytes. The data storage unit 1008 can store the received data, and can store 2 kilobytes in the present embodiment.

In step S1324, the data amount detection unit 1007 determines whether or not the data amount stored in the data storage unit 1008 has exceeded the threshold. In the present embodiment, a three-stage configuration is used as shown in FIG. 10, and therefore the threshold is set to 1.0 kilobytes in step S1321. If the threshold value is exceeded, the processing moves to step S1325, and if not, the processing moves to step S1327.

In step S1325, the data amount detection unit 1007 sets the stop signal 1032 to active to temporarily stop the operation of the data readout unit 111 on the transmission side 1 (image processing circuit 100) and the data readout unit 131 on the transmission side 2 (image processing circuit 120). However, for the image processing circuit 100, only transmission of the data addressed to the image processing circuit 1000 is temporarily stopped. The definition of "active" is as described above.

In step S1326, the data writing unit 1010 writes the data in the SDRAM 1015. Here, bus arbitration performed by the memory controller unit 1013 of the present embodiment is in a fixed priority level format. That is to say, if requests are issued from multiple bus masters simultaneously, the memory controller unit 1013 accepts a request from a high-priority-level bus master and the other bus masters wait to access the SDRAM 1015. In the present embodiment, the priority level of bus masters that require a real-time processing, such as the display control unit 1014, is set to be high, and there is a bus master with a higher priority level than the data writing unit 1010. For this reason, if a high-priority-level bus master that requires a real-time processing, such as a display system, occupies a band of the SDRAM 1015, the data writing unit 1010 waits to access the SDRAM 1015. In after step S1326, the processing returns to step S1324 and the above-described processing is repeated.

In step S1327, the data writing unit 1010 writes the data in the SDRAM 1015. In step S1328, the data amount detection unit 1007 sets the stop signal 1032 to the low level and cancels the active state.

In step S1329, the data writing unit 1010 determines whether or not data of the size designated in step S1322 has been received, and if there is data that has not been received, the processing returns to step S1323, and the above-described processing is repeated. If reception of data of the designated size is complete, the processing ends.

As described above, according to Embodiment 3, a configuration is used in which three or more image processing circuits are used, processed data is transmitted to the final image processing circuit simultaneously from multiple upstream image processing circuits, and thus distributed processing is performed. Also, with this configuration, a threshold value for determining whether or not to make the stop signal active in the storage unit for storing the processed data received by the latter-stage image processing circuit is changed according to the number of former-stage image processing circuits. Accordingly, even if a high-priority-level bus master that requires real-time processing such as a display system occupies the band of the SDRAM causing the data writing unit to wait to access the SDRAM, it is possible to prevent reception leakage of processed data without expanding the storage size of the final data storage unit.

Also, by having multiple storage units in the data readout unit 1020 of the upstream image processing circuit and using them separately for upper YCC transmission (for the image processing circuit 120) and lower YCC transmission (for the image processing circuit 1000), even if a band of an SDRAM of one image processing circuit of the multiple image processing circuits that are downstream data transmission destinations is occupied and cannot perform reception, transmission can be performed efficiently without stopping data transmission to the other image processing circuits.

Figure 13C:
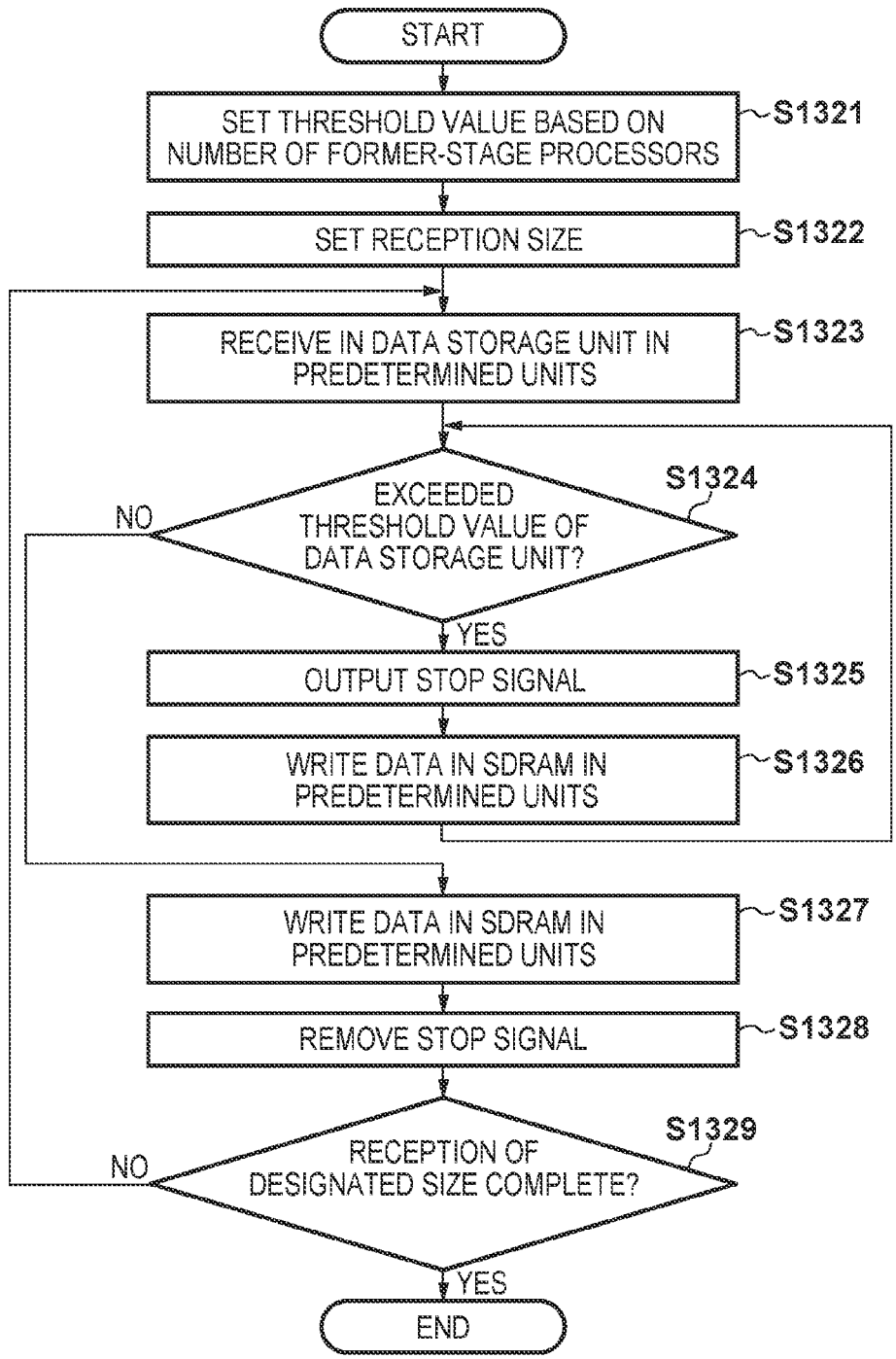

Note that since the reception flow control of the image processing circuit 120 is similar to that of steps S1321 to S1329 in FIG. 13C, description thereof will not be included here.

Also, although a timing chart was described with reference to FIG. 11, this is an example in the present embodiment, and there is no limitation on the type and processing timing of the data. Also, the threshold value detected by the data amount detection units 127 and 1007 is an example and there is no limitation on the threshold value. Also, the storage number of the data readout unit 1020 is an example, and there is no limitation on the storage number. Also, the identification information that is added to the header and identifies the unit that is the transmission destination is an example in the present embodiment, and there is no limitation on the identification information.

Also, Embodiment 3 and Embodiment 2 may be combined. In such a case, as described in Embodiment 2, the threshold value corresponding to the priority level of the data is set for each data type in Embodiment 3.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-176960, filed Sep. 8, 2015 which is hereby incorporated by reference herein in its entirety.

What is claimed is:
1. An image processing apparatus comprising:
an image capturing unit;
a first image processing circuit connected to the image capturing unit; and
a second image processing circuit connected to the first image processing circuit,
wherein a first memory is connected to the first image processing circuit and a second memory is connected to the second image processing circuit,
the first image processing circuit includes:
a separation unit configured to separate moving image data output from the image capturing unit into first data, which is a portion to be processed by the first image processing circuit, and second data, which is a portion to be processed by the second image processing circuit;
a first image processing unit configured to carry out predetermined processing on the first data output from the separation unit and to store the processed first data in the first memory;
a transmission unit configured to read out the first data processed by the first image processing unit from the first memory, multiplex the second data from the separation unit and the processed first data read out from the first memory, and transmit the multiplexed data to the second image processing circuit; and
a first control unit configured to control the transmission unit,
the second image processing circuit includes:
a reception unit configured to receive the multiplexed data transmitted by the transmission unit and separate the multiplexed data into the second data and the processed first data;
a storage unit configured to store the processed first data received by the reception unit in a buffer;
a writing unit configured to read out the processed first data from the storage unit and store the processed first data in the second memory;
a second image processing unit configured to carry out the predetermined processing on the second data received by the reception unit and store the processed second data in the second memory; and
a detection unit configured to output a control signal to the first image processing circuit in response to a data amount of the processed first data stored in the buffer reaching a threshold value, and
wherein the first control unit controls the transmission unit so as to stop transmission of the processed first data in response to the control signal from the detection unit.

2. The image processing apparatus according to claim 1, wherein
in response to the control signal from the detection unit, the first control unit controls the transmission unit so as to stop transmission of the processed first data while transmitting the second data to the second image processing circuit.

3. The image processing apparatus according to claim 1, wherein
the second image processing circuit includes a display control unit configured to read out the processed first data and the second data processed by the second image processing unit from the second memory and output the processed first data and the processed second data to a display apparatus.

4. The image processing apparatus according to claim 1, wherein
the processed first data includes a plurality of types of data, and
if a data amount of each of the plurality of types of data stored in the buffer reaches a threshold value corresponding to the type, the detection unit outputs the control signal.

5. The image processing apparatus according to claim 1, wherein
the predetermined processing includes developing processing for the moving image data and compression processing for compressing the moving image data resulting from the developing processing.

6. The image processing apparatus according to claim 1, wherein
the separation unit outputs a lower half of a frame of the moving image data output from the image capturing unit as the first data and outputs an upper half of a frame of the moving image data output from the image capturing unit as the second data.

7. The image processing apparatus according to claim 1, wherein
the first control unit controls the transmission unit so as to not transmit the first data output from the separation unit to the second image processing circuit.

8. The image processing apparatus according to claim 1, wherein
the first image processing circuit and the second image processing circuit are each constituted as a single semiconductor integrated circuit.

9. The image processing apparatus according to claim 1, wherein
the second data from the separation unit is outputted to the transmission unit without being stored in the first memory.

10. An image processing apparatus comprising:
an image capturing unit; and
a plurality of image processing circuits connected in series,
wherein the plurality of image processing circuits carry out predetermined processing on moving image data obtained by the image capturing unit,
one of the plurality of image processing circuits is connected to the image capturing unit,
the plurality of image processing circuits each include:
a reception unit configured to receive data including at least the moving image data obtained by the image capturing unit;
a separation unit configured to acquire moving image data that is a portion to be processed by the image processing circuit from the moving image data received by the reception unit, the separation unit being configured to output moving image data that is a portion to be processed by a latter-stage image processing circuit if the moving image data received by the reception unit includes the moving image data that is the portion to be processed by the latter-stage image processing circuit;
an image processing unit configured to carry out the predetermined processing on the moving image data, which is the portion that was acquired by the separation unit and is to be processed by the image processing unit, and store the resulting data in a memory;
a storage unit configured to store data processed by a former-stage image processing circuit in a buffer if the data processed by the former-stage image processing circuit is included in the data received by the reception unit;
a writing unit configured to read out the data processed by the former-stage image processing circuit from the buffer and write the data in the memory;
a detection unit configured to output a control signal to the former-stage image processing circuit in response to a data amount of data that was processed by the former-stage image processing circuit and stored in the buffer reaching a threshold value;
a transmission unit configured to, if the latter-stage image processing circuit is connected, read out the data processed by the image processing unit from the memory, multiplex the moving image data, which is the portion that was output from the separation unit and is to be processed by the latter-stage image processing circuit, and the data from the memory that was processed by the image processing unit, and transmit the multiplexed data to the latter-stage image processing circuit, the transmission unit being configured to transmit the data processed by the former-stage image processing circuit to the latter-stage image processing circuit as well in a case where the data processed by the former-stage image processing circuit is stored in the memory; and
a control unit configured to control the transmission unit,
wherein the control unit controls the transmission unit so as to stop transmission of the data processed by the image processing unit to the latter-stage image processing circuit in response to the control signal from the latter-stage image processing circuit.

11. The image processing apparatus according to claim 10, wherein
if the data received by the reception unit includes data processed by a plurality of former-stage image processing circuits, the detection unit outputs the control signal to each of the plurality of former-stage image processing circuits.

12. The image processing apparatus according to claim 10, wherein
a value corresponding to the number of the former-stage image processing circuits is set as the threshold value.

13. The image processing apparatus according to claim 10, wherein
the transmission unit transmits the data processed by the image processing unit to each of a plurality of latter-stage image processing circuits, and
the control unit controls the transmission unit so as to stop transmission of the data that was processed by the image processing unit and was addressed to the latter-stage image processing circuit that outputs the control signal among the plurality of latter-stage image processing circuits.

14. The image processing apparatus according to claim 10, wherein
the plurality of image processing circuits are each constituted as a single semiconductor integrated circuit.

* * * * *